US008006758B2

(12) United States Patent
Reynolds et al.

(10) Patent No.: US 8,006,758 B2
(45) Date of Patent: Aug. 30, 2011

(54) WASTE MATERIAL PROCESSING FOR OIL RECOVERY

(76) Inventors: Thomas A. Reynolds, Bend, OR (US); Roger A. Sramek, Tiburon, CA (US)

(*) Notice: Subject to any disclaimer, the term of this patent is extended or adjusted under 35 U.S.C. 154(b) by 0 days.

(21) Appl. No.: 12/110,374

(22) Filed: Apr. 28, 2008

(65) Prior Publication Data

US 2009/0266541 A1    Oct. 29, 2009

(51) Int. Cl.
*E21B 43/24* (2006.01)
(52) U.S. Cl. ............ 166/272.6; 166/303; 166/371
(58) Field of Classification Search .............. None
See application file for complete search history.

(56) References Cited

U.S. PATENT DOCUMENTS

| 3,853,759 | A | * | 12/1974 | Titmas | 210/600 |
| 4,381,035 | A | * | 4/1983 | Hradel | 166/307 |
| 4,983,278 | A | * | 1/1991 | Cha et al. | 208/407 |

* cited by examiner

*Primary Examiner* — Zakiya W. Bates
(74) *Attorney, Agent, or Firm* — David E. Lovejoy

(57) ABSTRACT

An enhanced oil recovery method and apparatus for thermal processing of polymer-based waste to produce organic and inorganic processed materials. The organic and inorganic processed materials are injected as an injection stream into the ground to liberate ground oil. The liberated ground oil is withdrawn from the ground. The injection stream interacts with the ground oil to form a new oil and the new oil including the ground oil is withdrawn from the ground. Thermal processing is done with pyrolysis of waste tires.

30 Claims, 14 Drawing Sheets

WASTE MATERIAL PROCESSING FOR OIL RECOVERY

TECHNICAL FIELD

The present invention relates to enhanced oil recovery (EOR) methods and apparatus and, in particular, to enhanced oil recovery wherein an organic/inorganic phase stream is injected into a ground formation having an oil-bearing reservoir.

BACKGROUND OF THE INVENTION

Enhanced oil recovery (EOR) refers to a variety of processes to increase the amount of oil that can be recovered from an oil reservoir. These processes increase the permeation of oil to a production well in the ground formation and fall into three general categories; Chemical Injection, Gas Injection and Thermal Recovery. These processes can be accomplished by injecting a substance into the ground formation such as water, a water and surfactant mixture, or a gas stream, such as Carbon Dioxide, Nitrogen, or by heating the ground oil by injecting Steam. Typically, these processes reduce the oil's viscosity in the reservoir and provide a driving force allowing the ground oil to more readily permeate to a production well for extraction. Enhanced oil recovery offers prospects for withdrawal of more of the oil present in the reservoir and is typically used after primary and secondary withdrawal methods have been exhausted. In general, enhanced oil recovery processes are used to make non-productive reservoirs more productive.

A variety of enhanced oil recovery techniques attempted or in use include processes such as surfactant flooding, polymer flooding, and caustic flooding; miscible displacement processes such as miscible solvent flooding, carbon dioxide flooding; inert gas flooding, and foam displacement such as foam displacement variations of steam or hot water flooding, and thermal processes such as steam stimulation or cyclic steam injection, steam or hot water flooding, or in situ combustion.

The type of enhanced oil recovery technique used is based upon characterization of the reservoir. Characterization leads to an increased knowledge of the reservoir, including the ground formation, type and amount of oil present, depth of the oil, and pressure. Knowledge of these factors is critical to select the type of enhanced oil recovery technique. Each enhanced oil recovery process has its advantages, limitations, and disadvantages. For example, steam stimulation or cyclic steam injection employs heat to reduce the viscosity of the oil in the formation being treated. However, the temperature achievable by the steam is limited by the pressure of the formation. For example, Heavy crude oil-bearing formations are generally at a formation depth within 2,000 feet of the ground surface, and more typically are at a formation depth of about 1,000 feet from the ground surface. The temperature of steam injected is about 280° C. at a depth of about 1,000 feet and about 235° C. at a depth of about 2,000 feet. A disadvantage of this process is the steam condenses into liquid water in the formation which is immiscible with the oil and can be a factor in a host of other problems during and after extraction.

In miscible solvent flooding, the injected solvent is miscible in the oil and reduces its viscosity allowing oil to permeate and does not have the disadvantages associated with the immiscible liquid water formed in the steam stimulation process. A disadvantage of this process is the flooding solvent is a liquid and, therefore, unlike steam, only contacts a much smaller portion of the formation. Furthermore, the miscible solvent flooding process is not a thermal process and does not introduce any significant amount of heat to reduce the viscosity of the oil present in the formation. Many of these techniques have been hampered by high cost of injection materials, production of heat, generation of injection pressure and in some cases result in significant volumes of waste products leading to expensive clean up costs.

In nearly all enhanced oil recovery processes, the materials forming the stream to be injected into the well are transported from offsite locations. Additionally, in the case of thermal recovery processes, it is necessary to heat the materials prior to injection at or near the injection well head. Such transporting and heating add costs to the enhanced oil recovery and these costs usually have a significant energy-related component. The cost of solvent flooding chemicals in many cases inhibits their use despite technical feasibility. To avoid these costs, it is desirable to have a source of chemicals, heat, and pressure at the oil field, or more preferably in close proximity to the injection well for use in producing the injection stream. Processes that generate heat include combustion, geothermal, solar, and others. The combustion processes require fuel and tend to cause greenhouse gas emission. The solar processes tend to be limited to certain areas and do not have a well established technology. The geothermal processes are restricted to very few locations.

In light of the great demand for oil around the world, there is increasing demand for improvements in enhanced oil recovery methods and apparatus.

SUMMARY

The present invention is an enhanced oil recovery method and apparatus for thermal processing of polymer-based waste to produce organic and inorganic processed materials. The organic and inorganic processed materials are injected as an injection stream into the ground to liberate ground oil. The liberated ground oil is withdrawn from the ground. The injection stream interacts with the ground oil to form a new oil and the new oil including the ground oil is withdrawn from the ground.

In one embodiment, the thermal processing is pyrolysis and the waste is tires.

In one embodiment, the thermal processing of polymer-based waste is performed in proximity to an injection well site.

In one embodiment, the injection stream and the ground oil form a new oil that permeates one or more barrier regions that impede the permeation of ground oil.

In one embodiment, the injection stream has adjustable parameters including temperature, pressure and miscibility for increasing the permeability of the ground oil. In one example, the injection stream elevates the temperature of the new oil relative to the ground oil to enable permeation of the new oil through one or more barrier regions. The new oil has a decreased viscosity relative to the ground oil before and after the one or more barrier regions. In one example, the injection stream and the ground oil are miscible. In one example, the injection stream is injected into the ground with an elevated pressure whereby the injection stream and the ground oil form a new oil for causing the new oil to permeate one or more barrier regions.

In one embodiment, the ground oil is bound to one or more ground regions with an adhesion force and wherein one or more of the adjustable parameters of temperature, pressure and miscibility of the injection stream cause the adhesion force to be overcome.

In one embodiment, the injection stream is substantially free of water.

In one embodiment where the thermal processing step is performed with a pyrolysis apparatus, the pyrolysis apparatus includes a plurality of reactors. In one example, the reactors are batch processing reactors.

The foregoing and other objects, features and advantages of the invention will be apparent from the following detailed description in conjunction with the drawings.

DETAILED DESCRIPTION

Figure 1:
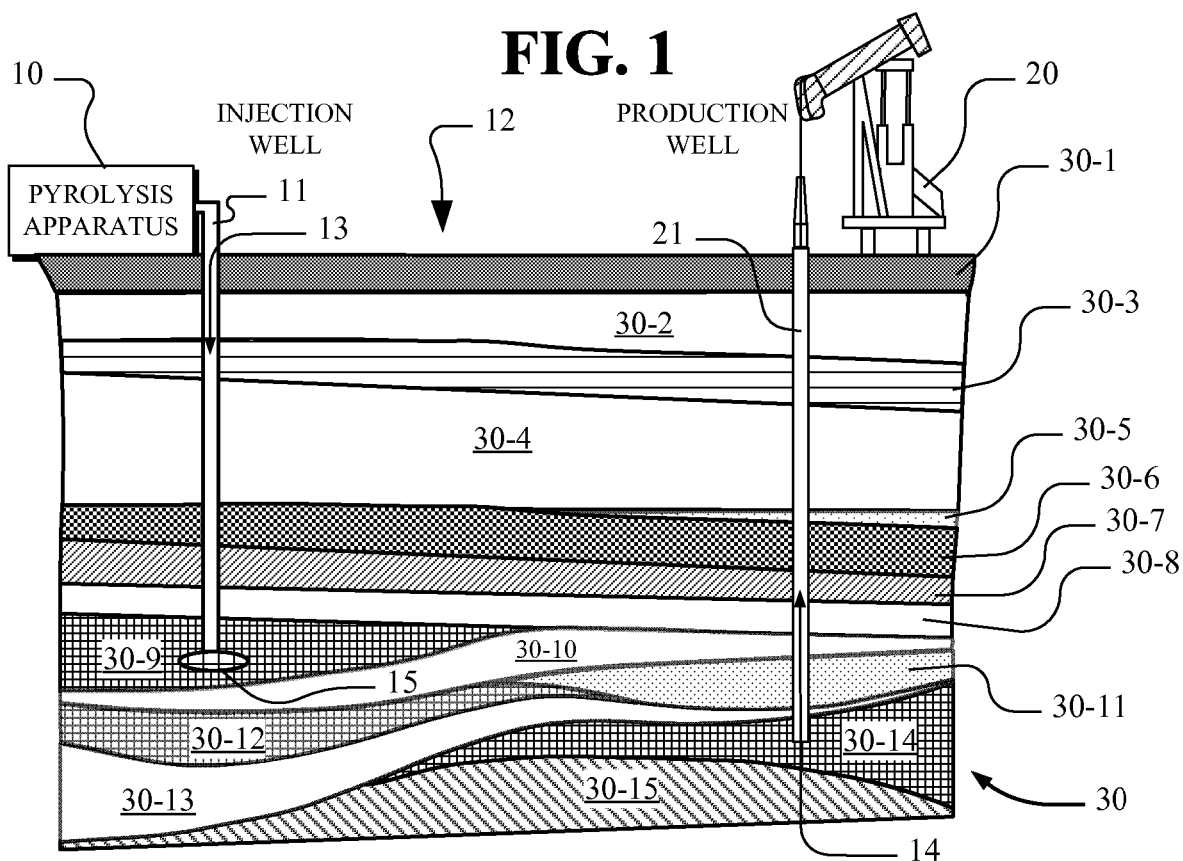
FIG. 1 is a schematic representation of enhanced oil recovery in an oil field including an injection well and a production well extending into a ground formation having reservoirs of entrapped ground oil.

In FIG. 1, enhanced oil recovery (EOR) is done in an oil field 12. The oil field 12 includes a ground formation including a number of layers 30-1, 30-2, . . . , 30-15. These layers, and specifically layers 30-9, 30-12 and 30-14, include entrapped ground oil. Often, the entrapped ground oil can not be efficiently recovered and such condition often results after primary and secondary recovery has occurred in the oil field 12.

The oil field 12 includes an injection well 11 and a production well 21. A pyrolysis apparatus 10 connects to and supplies an injection stream 13, formed from products of on-site pyrolysis, into the injection well 11. The injection stream 13 may penetrate an oil-bearing formation such as ground oil layer 30-9 or may penetrate some other layer in proximity to an oil-bearing formation so that it in time it permeates to the oil-bearing formation. In the FIG. 1 example of the oil field 12, the injection stream 13 is injected directly into the ground oil 30-9. After sufficient time, the injection stream 13, will form new oil 15 which is a combination of the injection stream 13 and the ground oil 30-9. The new oil 15 over time will permeate through layers 30-10, 30-12 and 30-13 to the ground oil region 30-14. In region 30-14, the new oil 15 interacts with the ground oil 30-9 to again form new oil 15 that permeates to production well 21. The new oil 15 in the oil-bearing formation 30-14 is collected in an exit stream 14 at the production well 21 and is withdrawn the oil-bearing formation 30-14, typically under the force of pump 20.

The pyrolysis apparatus 10 of FIG. 1 is used to pyrolyze carbon-based polymeric materials to produce, for example, pyro-solids, pyro-liquids and pyro-gases. The pyro-gases can be combusted to provide heat for the pryolysis process occurring in pyrolysis apparatus 10. When both carbon and inorganic materials are present, pyrolysis in pyrolysis apparatus 10 under controlled conditions leads to highly useful and unique output materials. One important example of carbon-based polymeric materials for pyrolysis are used tires (typically from automobiles, trucks and other vehicles). The pyrolysis of tires results in, among other things, a carbon/inorganic residue of pyro-solids (char), pyro-oils and pyro-gases.

The composition of pyro-solids, pyro-liquids and pyro-gases is determined by the materials that are used to manufacture tires. The principal tire materials used to manufacture tires include rubber (natural and synthetic), carbon black (to give strength and abrasion resistance), sulfur (to cross-link the rubber molecules in a heating process known as vulcanization), accelerator metal oxides (to speed up vulcanization), activation inorganic oxides (principally zinc oxide, to assist the vulcanization), antioxidant oxides (to prevent sidewall cracking), a textile fabric (to reinforce the carcass of the tire) and steel belts for strength. The carbon black has a number of carbon structures including graphitic spheroids some with nanometer dimensions, semi graphitic particles and other forms of ordered carbon structures.

In the manufacture of tires, the tire materials are mixed forming a homogenous "green" tire including carbons and oxides. The "green" tire is transformed into a finished tire by a curing process (vulcanization) where heat and pressure are applied to the "green" tire for a prescribed "cure" time.

When tires are discarded, they are collected for pyrolysis processing to reclaim useful components of the tires where the useful components are the tire materials used to form the "green tires". In general, tire pyrolysis involves the thermal degradation of the tires in the absence of oxygen. Tire pyrolysis is used to convert tires into pyro-materials including pyrolysis gases (pyro-gases), pyrolysis oils (pyro-oils), and pyrolysis solids (pyro-chars) and steel. A by-product of the pyrolysis process is the generation of a substantial amount of heat and this heat is recovered for use in the enhanced oil recovery. To enhance value, pyro-materials can under go additional processes after the pyrolysis is complete.

In FIG. 1, the injection stream 13 is formed from the pyro-materials from the pyrolysis apparatus 10. The injection stream 13 is optimized by selecting a combination of the pyro-materials and their for injection into the injection well 11. The solids, liquids and gases are mixed and heated to desired temperatures and pressures in the injection stream 13.

The pyro-gases include processed pyro-gas, combustion gases (such as CO, $CO_2$), helium, nitrogen, and hydrocarbon gasses, sulfur containing hydrocarbon gases, other by-products derived from the pyrolysis process including gases such as vapor-phase metals.

The pyro-solids are materials including char that contain a number of inorganic materials, including materials such as metal sulfides and metal oxides and carbon. The solids introduced into the injection stream 13 can include post-processed char that has been externally milled or modified.

The liquids include pyro-oil, a number of hydrocarbons and other liquids such as liquids that contain dissolved inorganic metals. The liquids can also include solubilizing agents such as sulfur containing hydrocarbons and other by-products derived from the pyrolysis process.

Examples of the above materials are listed in the following TABLE 1, TABLE 2, TABLE 3 and TABLE 4. The concentration ratios of pyro-liquids and pyro-gases can be controlled by adjusting the pyrolysis temperature as shown in Table 1. The pyro-liquids can also be adjusted by removing them from the pyrolysis apparatus at different times.

In TABLE 1, the Percent Composition of Pyrolysis Gas and Oils as a function of Pyrolysis Temperature is presented.

TABLE 1

| Pyro-Gas and Pyro-Oils | Pyrolysis Temperatures (° C.) | | |
|---|---|---|---|
| | 640 | 740 | 840 |
| Hydrogen | 0.46 | 0.78 | 1.35 |
| Methane | 5.05 | 10.2 | 12.21 |
| Ethylene | 1.71 | 2.58 | 2.1 |
| Ethane | 1.13 | 1.21 | 0.62 |
| Propane | 1.69 | 0.73 | 0.17 |
| iso-Butene | 0.83 | 0.18 | 0.0 |
| 1.3-Butadiene | 0.49 | 0.26 | 0.07 |
| 2-Butene | 0.53 | 0.09 | 0.0 |
| Isoprene | 0.95 | 0.12 | 0.05 |
| Cyclopentadiene | 0.31 | 0.08 | 0.1 |
| Benzene | 1.42 | 4.22 | 5.9 |
| Toluene | 1.97 | 3.81 | 3.29 |
| Xylenes + ethylbenzene | 2.13 | 1.93 | 1.09 |
| Styrene | 2.04 | 2.134 | 2.132 |
| Indene | 0.49 | 0.78 | 0.98 |
| Naphthalene | 0.14 | 0.9 | 1.86 |
| Methylnaphthalene | 0.38 | 0.68 | 0.90 |
| Diphenyl | 0.40 | 0.134 | 0.41 |
| Acenaphthyls | 0.00 | 0.15 | 0.35 |
| Fluorene | 0.00 | 0.11 | 0.11 |
| Phenanthrene | 0.00 | 0.08 | 0.28 |
| Other including (S and O bearing) | 29.29 | 28.5 | 30.54 |
| Fillers | 7.24 | 7.85 | 7.08 |
| Water | 0.82 | 0.35 | 1.2 |

TABLE 1-continued

| Pyro-Gas and Pyro-Oils | Pyrolysis Temperatures (° C.) | | |
|---|---|---|---|
| | 640 | 740 | 840 |
| Acid Gases | 0.45 | 1.55 | 0.73 |
| Pyrolysis Oils | 39.7 | 30.18 | 26.29 |
| Total | 100 | 100 | 100 |

In TABLE 2, the Percent Composition of Pyrolysis Gas and Oils by weight as a function of extraction.

TABLE 2

| Material | Percent by Weight | |
|---|---|---|
| | 1 min | 5 min |
| Higher aliphatics | 5.1 | 5.5 |
| Higher Aromatics | 2.4 | 0.5 |
| Higher Olefinics | 7.9 | 2.1 |
| Hydrogen | 1.4 | 3.5 |
| Methane | 20.2 | 22.1 |
| Ethylene | 18 | 19.9 |
| Ethane | 4.2 | 5.7 |
| Propene | 6.9 | 11.1 |
| 1.3-Butadiene | 2.7 | 5.3 |
| Benzene | 18.3 | 11.5 |
| Toluene | 12 | 7.9 |
| Xylene and Ethyl-benzene | 2.9 | 3.1 |
| Styrene | 3.8 | 3.1 |
| Naphthalene | 2.1 | 0.8 |

The carbon materials used in "green" tires are typically as indicated in TABLE 3

TABLE 3

| DESIGNATION | SIZE (nm) |
|---|---|
| N110 | 20-25 |
| N220 | 24-133 |
| N1330 | 28-36 |
| N300 | 30-35 |
| N550 | 39-55 |
| N683 | 49-73 |

After pyrolysis of tires, the composition of char, for one typical example, includes carbon of the type previously indicated in TABLE 3 and includes inorganic materials, such as metal sulfides and metal oxides, as indicated in the following TABLE 4:

TABLE 4

| MATERIAL | FORMULA | x RANGE |
|---|---|---|
| Aluminum oxide (Al) | $Al_2O_{(3-x)}S_x$ | 0 to 3 |
| Barium oxide (Ba) | $BaO_{(1-x)}S_x$ | 0 to 3 |
| Bismuth oxide (Bi) | $Bi_2O_{(3-x)}S_x$ | 0 to 3 |
| Calcium oxide (Ca) | $CaO_{(1-x)}S_x$ | 0 to 1 |
| Chromium oxide (Cr) | $Cr_2O_{(3-x)}S_x$ | 0 to 3 |
| Iron oxide (Fe) | $Fe_2O_{(3-x)}S_x$ | 0 to 3 |
| Iron oxide (Fe) | $FeO_{(2-x)}S_x$ | 0 to 2 |
| Lead oxide (Pb) | $FeO_{(1-x)}S_x$ | 0 to 1 |
| Magnesium oxide (Mg) | $MgO_{(1-x)}S_x$ | 0 to 2 |
| Manganese oxide (Mn) | $Mn_2O_{(3-x)}S_x$ | 0 to 3 |
| Molybdenum oxide (Mo) | $Mo_2O_{(3-x)}S_x$ | 0 to 3 |
| Molybdenum oxide (Mo) | $MoO_{(2-x)}S_x$ | 0 to 2 |
| Phosphorous oxide (P) | $P_2O_{(5-x)}S_x$ | 0 to 5 |
| Potassium oxide (K) | $K_2O_{(1-x)}S_x$ | 0 to 1 |
| Silicon oxide (Si) | $SiO_{(2-x)}S_x$ | 0 to 2 |
| Sodium oxide (Na) | $Na_2O_{(1-x)}S_x$ | 0 to 2 |

TABLE 4-continued

| MATERIAL | FORMULA | x RANGE |
|---|---|---|
| Stronium oxide (Sr) | $SrO_{(1-x)}S_x$ | 0 to 1 |
| Titanium oxide (Ti) | $Ti_2O_{(3-x)}S_x$ | 0 to 3 |
| Titanium oxide (Ti) | $TiO_{(2-x)}S_x$ | 0 to 2 |
| Zinc oxide (Zn) | $ZnO_{(1-x)}S_x$ | 0 to 1 |
| Other Metal oxides (trace) | | |
| Pyrolitic Carbon | $C_{6m}C_n$ | m > n(aromatic) |

The TABLE 4 materials are essentially "heavy metal free" in that even if trace amounts of heavy metals are produced as a result of tire pyrolysis, the trace amounts are so small that no environmental hazard is presented.

Char obtained from the pyrolysis of tires is an inexpensive source of pyrolysis solids (pyro-char) that, with further control and added processing, are potentially useful in many fields and particularly in the enhanced oil recovery field. The ability to use pyro-char derived from thermal processing is dependent on controlling the adjustable parameters of the tire pyrolysis process and the post processing.

One particular application of the char, components in Table 3 and Table 4, is to mix with the pyro-oils and pyro-gases to form a liquid or vapor injection stream 13. The char is useful in chemical or other reactions that take place in a ground formation at the interface between the new oil 15, ground oil 30-9 and ground and ground particles that are components of the geologic formation. These reactions are beneficial in decreasing the viscosity of the oil by several mechanisms including reducing the adhesion of ground oil 30-9 bound in the barrier region 30-10 through chemical reactions and other mechanisms such as transferring heat.

In one example of reactions, between the char included in the injection stream 13 reacts with the ground particles adhered to the ground oil 30-12. When the injection stream 13 includes organic, inorganic and polymeric electrolyte materials, the electrolyte materials, for example, aide in promoting chemical reactions in the ground formation 30. Certain ones of these chemical reactions produce heat that further reduces adhesion between the ground oil 30-12 bound to the ground and ground particles. The result of such heat is an increase in the mobility of the ground oil 30-12 and new oil 15. Furthermore since the materials of the type listed in TABLE 3 and pyro-char listed in TABLE 4 contain nanometer-sized particles, and clusters of particles with rapid permeability in the ground and in the ground barrier regions 30-10 and 30-12 allows efficient permeation in those regions. The pyro-char particles penetrate onto the barrier region 30-10 rapidly. Since the pyro-char have a higher heat capacity, due to their inorganic composition and higher density, the pyro-char efficiently carry heat into the ground and into the barrier regions thereby reducing the viscosity of the ground oil 30-9 and new oil 15 therein.

Figure 2:
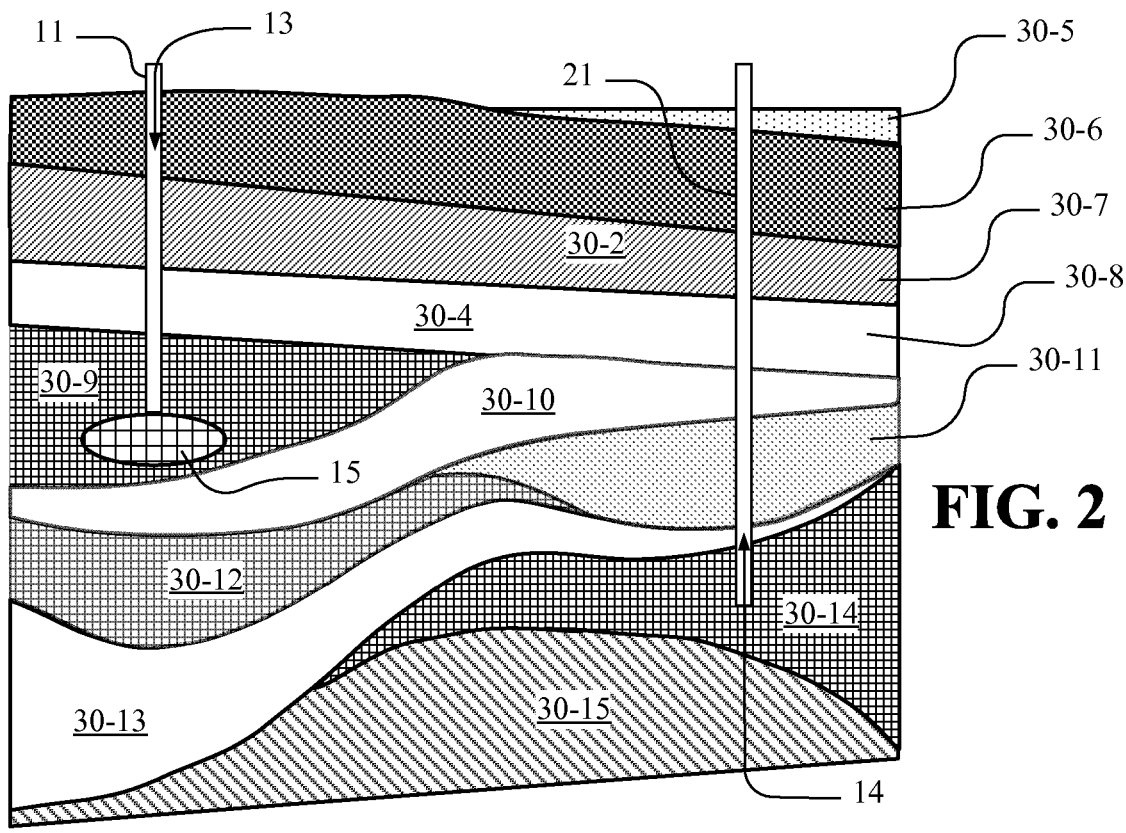
FIG. 2 depicts a schematic representation of a number of the layers in FIG. 1 depicting the entrapped ground oil in the ground formation.

FIG. 2 depicts a schematic representation of layers 30-5, 30-6, . . . , 30-15 in FIG. 1 including entrapped oil in the layers 30-9, 30-12 and 30-14. In FIG. 2, the injection stream 13 penetrates the ground oil 30-9. After sufficient time, the injection stream 13 will form new oil 15 with the ground oil 30-9 which will permeate through layers 30-10, 30-12 and 30-13 to ground oil region 30-14. In region 30-14, new oil 15 pushes the ground oil 30-9 toward the production well 21. Also, over time, the new oil 15 may combine with ground oil 30-14 to again form new oil 15 which permeates to production well 21 and is collected in an exit stream 14 by the production well 21. The injection stream 13 operates to liberate the ground oil in layers 30-9, 30-12 and 30-14.

Figure 3:
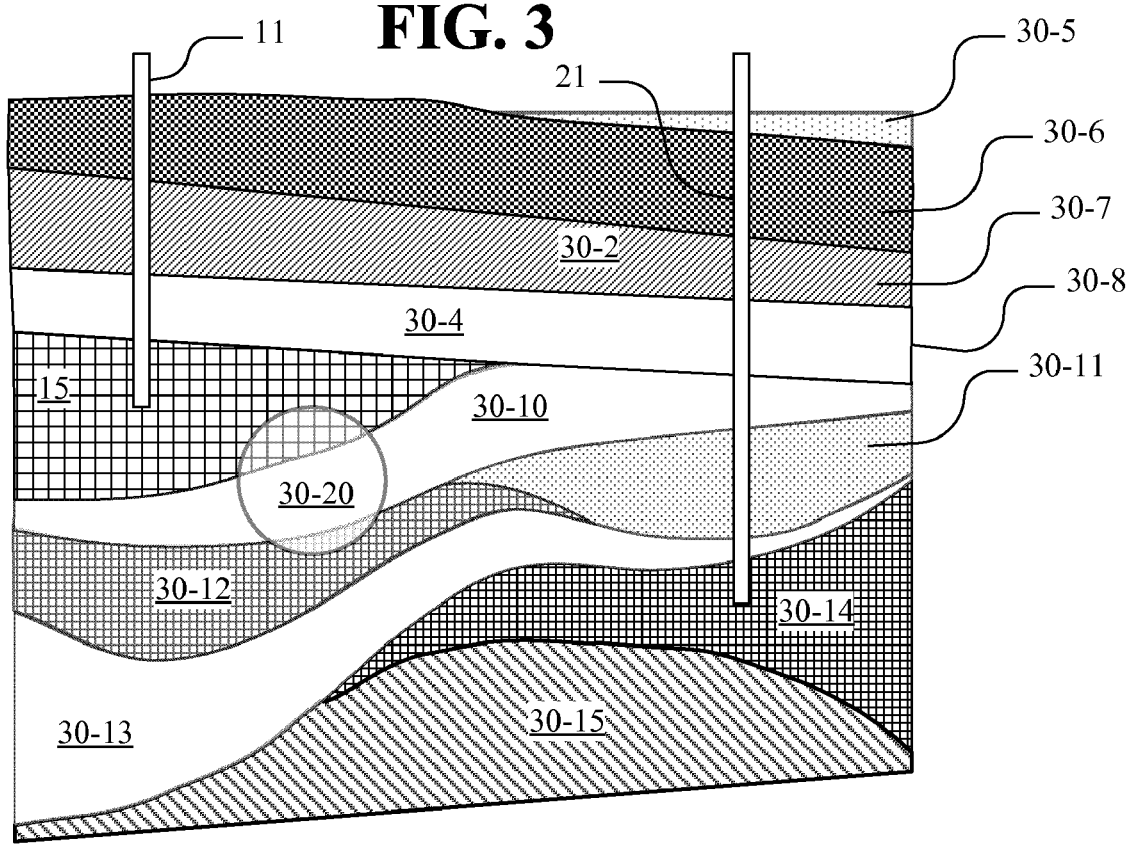
FIG. 3 depicts a schematic representation of the oil field layers of FIG. 1 including a particular region highlighted by a circle.

FIG. 3 depicts a schematic representation of the oil field layers of FIG. 1 and FIG. 2 including a particular region 30-20 highlighted by a circle. The region 30-20 borders the region now having the new oil 15, the barrier region 30-10 and the region including the ground oil 30-12.

Figure 4:
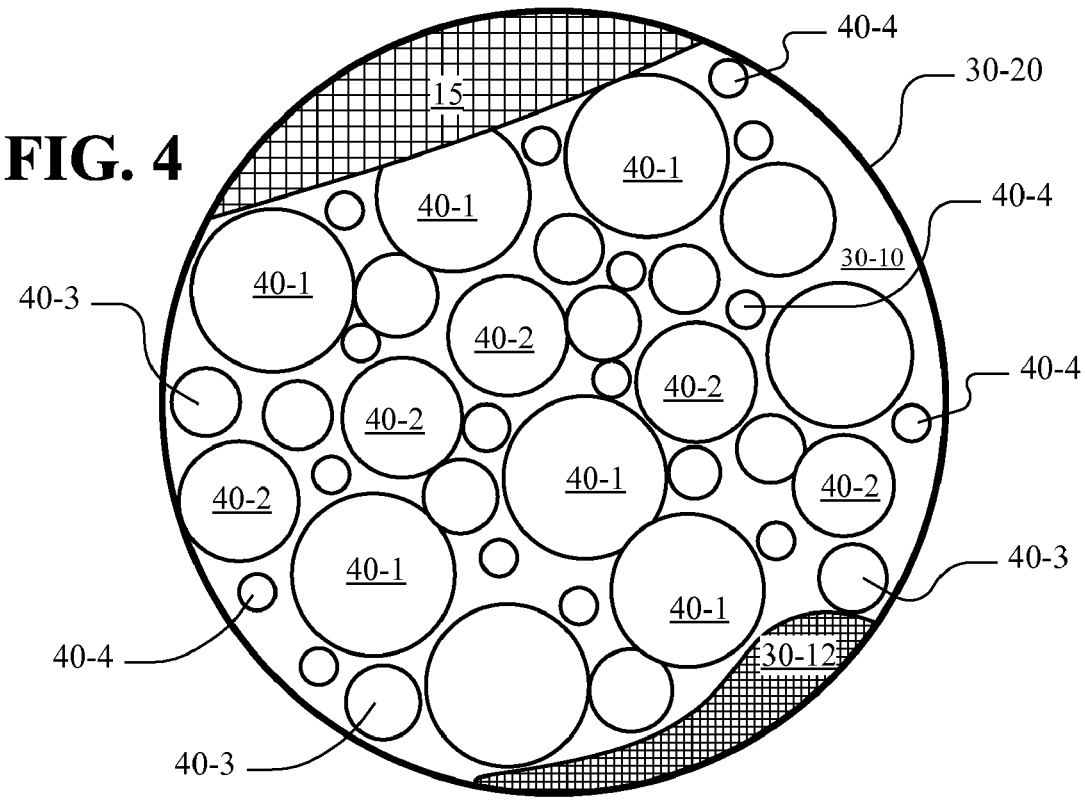
FIG. 4 depicts an exploded schematic representation of the highlighted region of FIG. 3.

FIG. 4 depicts an exploded schematic representation of the highlighted region 30-20 of FIG. 3. In FIG. 4, the circles 40 are schematic representations of ground composition in the barrier region. In some cases, the ground oil is bound to one or more ground regions (such as 40-1, 40-2, 40-3 and 40-4) with an adhesion force. The one or more adjustable parameters of the injection stream 13 cause this adhesion force to be overcome allowing the permeation of the new oil through the barrier region 30-10.

In FIG. 4, the circles 40 are not drawn to scale and do not depict actual sizes and shapes. For example, the circles 40 represent ground or ground particles that range in size from tens of meters to a few nanometers or less. For purposes of explanation, four different circle sizes are shown to represent the nature of the barrier impeding ground oil permeation. The region 30-20 borders the region now having the new oil 15, the barrier region 30-10 and the region including the ground oil 30-12.

Figure 5:
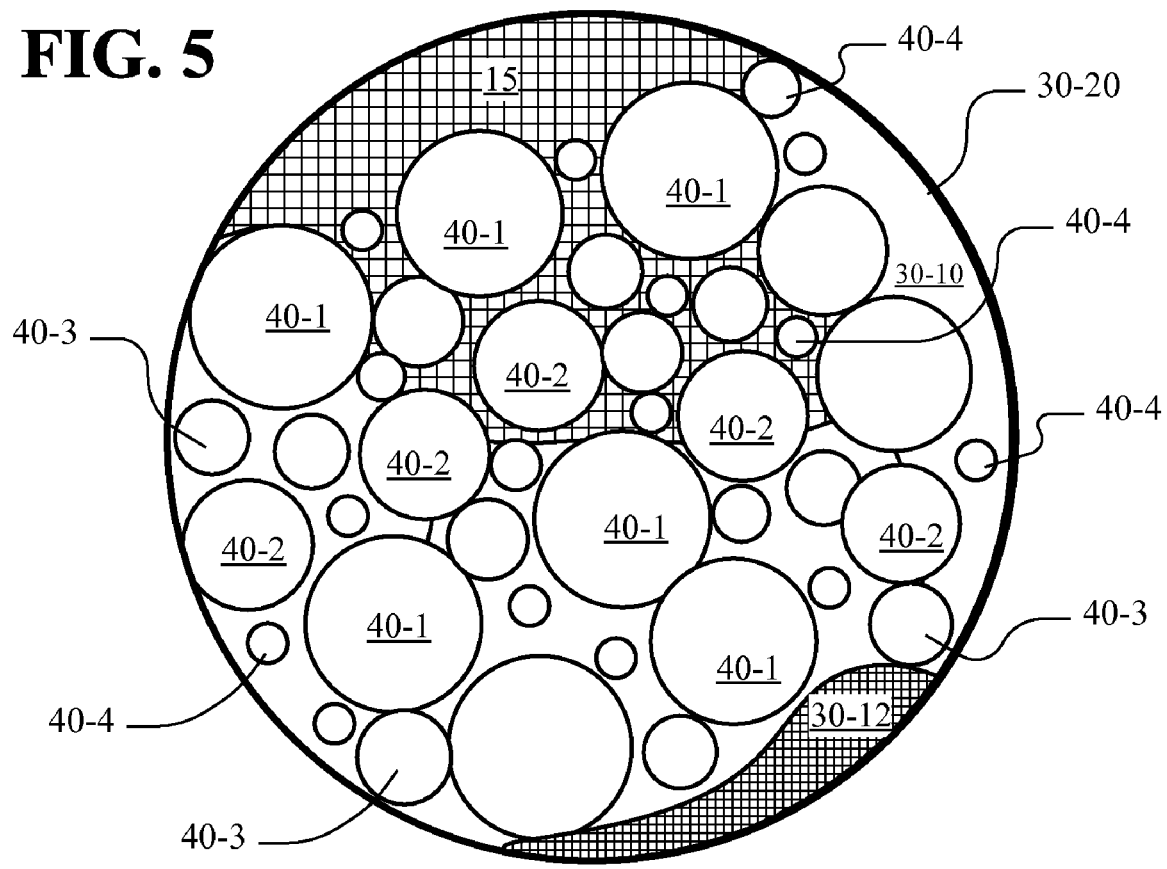
FIG. 5 depicts a schematic representation of the highlighted region of FIG. 4 after enhanced oil recovery processing has been active for an initial period of time.

FIG. 5 depicts a schematic representation of the highlighted region of FIG. 4 after enhanced oil recovery processing has been active for an initial period of time. The region 30-20 borders the region now having the new oil 15 penetrating into the barrier region 30-10 but not yet reaching the region including the ground oil 30-12. The new oil 15 of the injection stream 13 has adjustable parameters including temperature, pressure and miscibility for increasing the mobility of the ground oil 30-9 (see FIG. 2). For example, the injection stream 13 elevates the temperature of the new oil 15 to enable more rapid permeation of the new oil 15 through the barrier region 30-10. With elevated temperature, the new oil 15 has a decreased viscosity. The injection stream 13 is provided such that the injection stream 13 and the ground oil 30-9 are miscible. Also, the injection stream 13 can be injected into the ground with an elevated pressure for causing the new oil 15 to permeate one or more barrier regions and particularly barrier region 30-10. In some cases, the ground oil is bound to one or more ground regions (such as one or more of the regions 40-1, 40-2, 40-3 and 40-4) with an adhesion force. The one or more adjustable parameters of the injection stream 13 cause this adhesion force to be overcome allowing the permeation of the new oil 15 through the barrier region 30-10.

Figure 6:
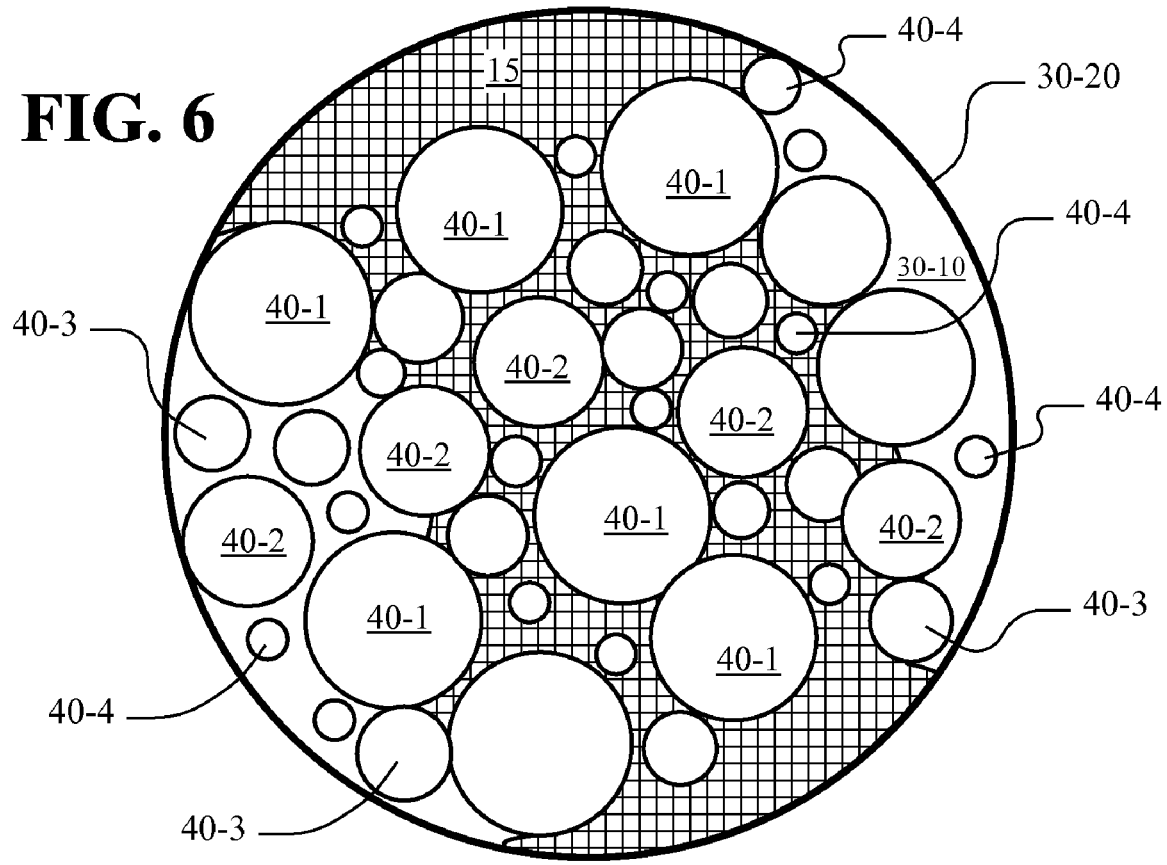
FIG. 6 depicts a schematic representation of the highlighted barrier region of FIG. 5 after enhanced oil recovery processing has been active for a longer period of time.

FIG. 6 depicts a schematic representation of the highlighted barrier region 30-10 of FIG. 5 after enhanced oil recovery processing has been active for a longer period of time. The region 30-10 borders the region now having the new oil 15 penetrating through the entire region 30-20 to and interacting with and hence replacing ground oil 30-12 of FIG. 5. The new oil 15 of the injection stream 13 has parameters including temperature, pressure, chemical potential and miscibility for increasing the mobility of the ground oil 30-9 (see FIG. 2). For example, the injection stream 13 elevates the temperature of the new oil 15 to enable permeation of the new oil 15 through the barrier region 30-10. The elevated temperature of the new oil 15 has a decreased viscosity. The injection stream 13 is provided such that the injection stream 13 and the ground oil 30-9 are miscible. Also, the injection stream can be injected into the ground with an elevated pressure for causing the new oil 15 to permeate one or more barrier regions and particularly barrier region 30-20. In some cases, the ground oil is bound to one or more ground regions 40 (such as one or more of the regions 40-1, 40-2, 40-3 and 40-4) with an adhesion force. The one or more adjustable parameters of the injection stream 13 cause this adhesion force to be overcome allow the permeation of the new oil 15 through the barrier region 30-10. The injection stream 13 of FIG. 1 and the new oil 15 operate to liberate the ground oil in layer 30-9 by causing permeation of the new oil 15 through the barrier region 30-10.

Figure 7:
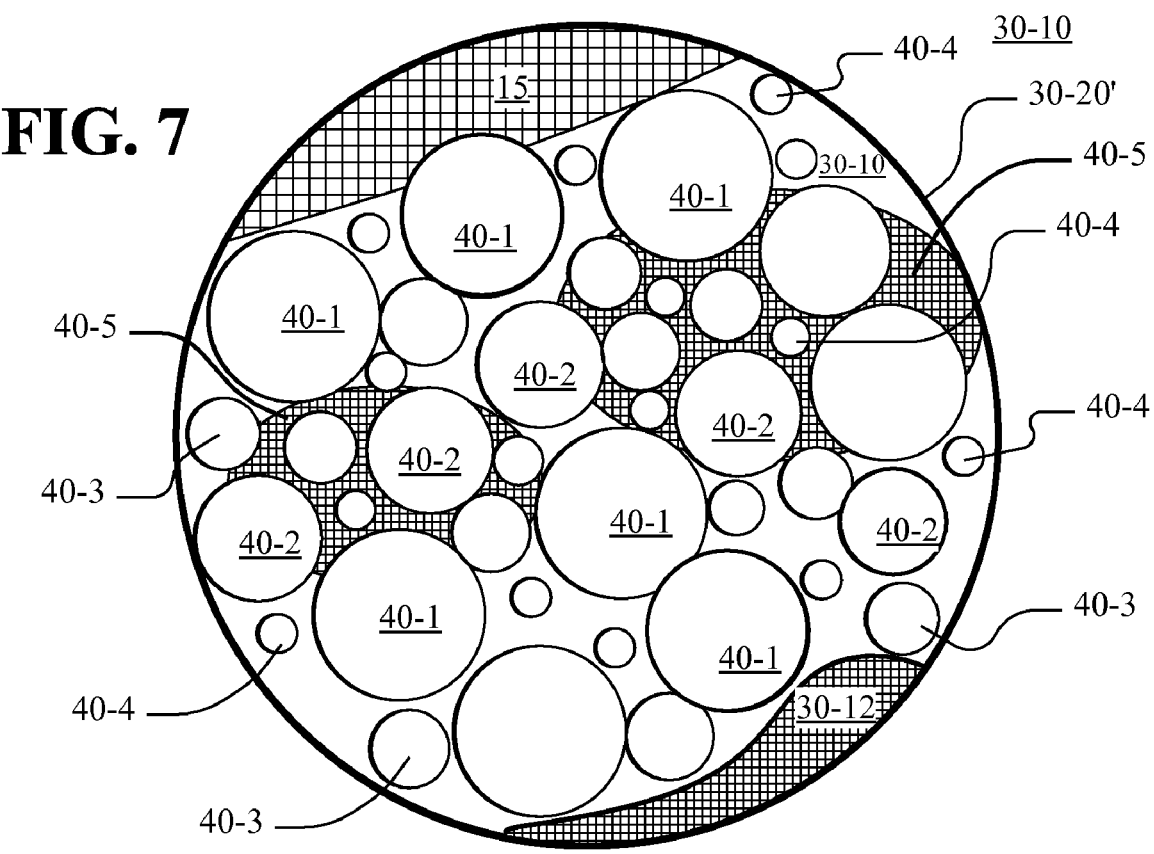
FIG. 7 depicts a schematic representation of another barrier region substantially the same as the highlighted barrier region of FIG. 3 and also including two reservoirs of entrapped ground oil.

FIG. 7 depicts a schematic representation of another barrier region 30-20' substantially the same as the highlighted barrier region 30-12 of FIG. 3 and barrier region 30-20' also includes two reservoirs 40-5 of entrapped ground oil after enhanced oil recovery processing has been active for an initial period of time. In FIG. 7, the circles 40 are schematic representations of ground composition in the barrier region. The circles 40 are not drawn to scale and do not depict actual sizes and shapes. For purposes of explanation, four different circle sizes are shown to represent the nature of the barrier impeding ground oil flow. The region 30-20' borders the region now having the new oil 15, the barrier region 30-10 and the region including the ground oil 30-12. In FIG. 7, the ground oil in reservoirs 40-5 are entrapped and adhered to the ground regions 40.

Figure 8:
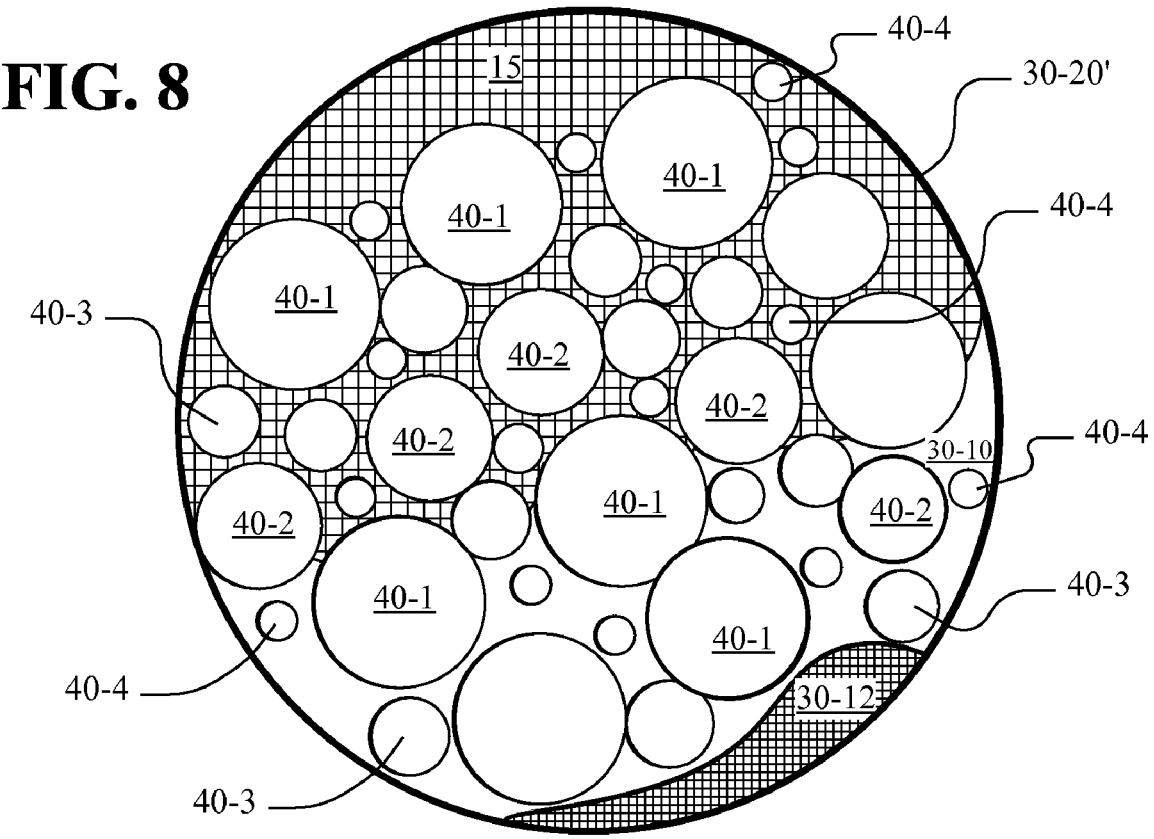
FIG. 8 depicts a schematic representation of the highlighted barrier region of FIG. 7 after enhanced oil recovery processing has been active for an initial period of time.

FIG. 8 depicts a schematic representation of the highlighted barrier region 30-20' of FIG. 7 after enhanced oil recovery processing has been active for an initial period of time. The region 30-20' borders the region now having the new oil 15 penetrating into the region 30-10 and interacts with the ground oil in reservoirs 40-5 of FIG. 7 converting them into new oil 15 but not yet reaching the region including the ground oil 30-12. The new oil 15 of the injection stream 13 has parameters including temperature, pressure and miscibility for increasing the mobility of the ground oil 30-9 (see FIG. 2) and the ground oil reservoirs 40-5 of FIG. 7. In one example, the injection stream 13 elevates the temperature of the new oil 15 to enable permeation of the new oil 15 through the barrier region 30-10. With the elevated temperature of the new oil 15, the new oil 15 has a decreased viscosity relative to the viscosity of the oil in reservoirs 40-5. The injection stream 13 is provided such that the injection stream 13 and the ground oil 30-9 and the ground oil in reservoirs 40-5 are miscible. Also, the injection stream 13 can be injected into the ground with an elevated pressure for causing the new oil 15 to permeate one or more barrier regions and particularly barrier region 30-10. In some cases, the ground oil is bound to one or more ground regions (such as regions 40-1, 40-2, 40-3 and 40-4) with an adhesion force. The adhesion force, for example, can be a chemical attraction between the ground oil and the ground region and ground particles 40 therein. The one or more adjustable parameters of the injection stream 13 cause this adhesion force to be overcome allowing the permeation of the new oil through the barrier region 30-20. The permeation continues through the barrier region 30-20'. Finally, the new oil 15 will penetrate through the entire region 30-20+ to, interacting with and hence replacing ground oil 30-12 of FIG. 7 and the result will appear the same as in FIG. 6. The injection stream 13 of FIG. 1 and the new oil 15 of FIG. 7 and FIG. 8 operate to liberate the ground oil in reservoirs 40-5 by causing the permeation of the new oil 15 through the barrier region 30-10.

Figure 9:
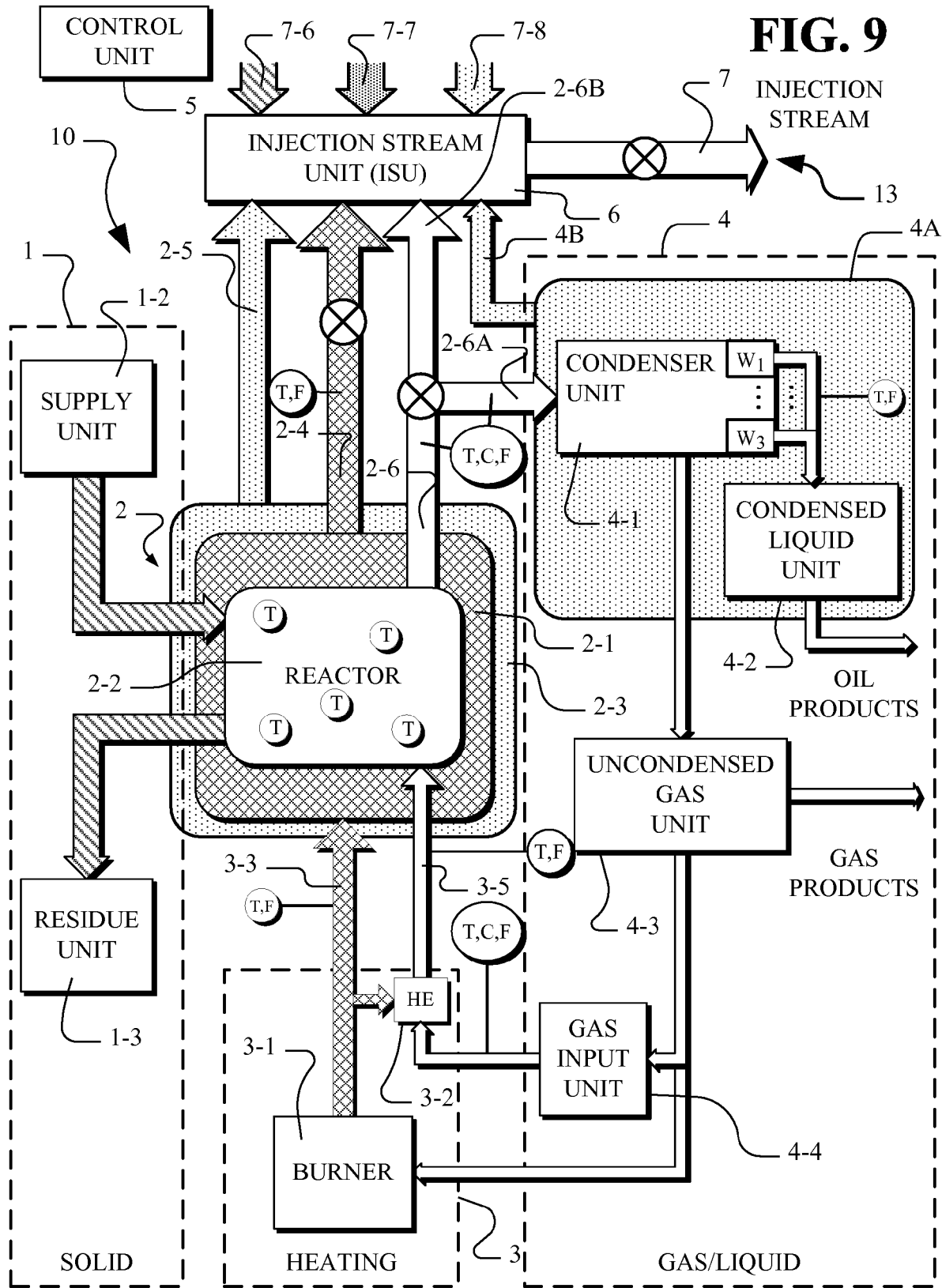
FIG. 9 depicts a schematic representation of one example of the pyrolysis apparatus included in FIG. 1.

In FIG. 9, a schematic block diagram of one example of the pyrolysis apparatus 10 of FIG. 1 is shown. When carbon-based polymeric materials are pyrolyzed in the pyrolysis apparatus 10, the process of pyrolysis can occur leading to the output of pyro-solids, pyro-liquids and pyro-gases. The pyro-gases can be combusted to provide heat for the pyrolysis apparatus 10. When both carbon and inorganic materials are present, pyrolysis under controlled conditions leads to highly useful and unique outputs. An example of a use of pyrolysis is for the break down of used tires (typically from automobiles, trucks and other vehicles). The pyrolysis of tires results in, among other things, a carbon/inorganic residue called char, pyro-oils and pyro-gases (see TABLE 1 through TABLE 4). Pyrolysis is performed with low emissions and other steps that do not have an adverse impact on the environment.

The composition of pyro-solids, pyro-liquids and pyro-gases is determined by the materials that are used to manufacture tires. The principal materials used to manufacture tires include rubber (natural and synthetic), carbon black (to give strength and abrasion resistance), sulfur (to cross-link the rubber molecules in a heating process known as vulcanization), accelerator metal oxides (to speed up vulcanization), activation inorganic oxides (principally zinc oxide, to assist the vulcanization), antioxidant oxides (to prevent sidewall cracking), a textile fabric (to reinforce the carcass of the tire) and steel belts for strength. The carbon black has a number of carbon structures including graphitic spheroids with nanometer dimensions, semi graphitic particles and other forms of ordered carbon structures.

In summary, the manufacture of tires initially mixes the materials to form a "green" tire where the carbons and oxides form a homogenous mixture. The "green" tire is transformed into a finished tire by the curing process (vulcanization) where heat and pressure are applied to the "green" tire for a prescribed "cure" time.

In FIG. 9, the pyrolysis apparatus 10 in the example shown is a batch pyrolysis apparatus and includes the solid processing units 1, the reactor 2, the heating units 3, the gas/liquid units 4, the injection stream unit 6 and the control unit 5.

In FIG. 9, the solid processing units 1 include the supply unit 1-2 and the residue unit 1-3. The supply unit 1-2 functions to introduce waste tires or other supply material into the reactor 2. The waste tires can be either in the form of whole tires or cut tires. Typically, tires are washed and cleaned in a washing machine in supply unit 1-2 to remove foreign matter such as dirt, oil, sand or other undesirable material. The cleaning is done with heated water or steam generated by fuel or heat available from the pyrolysis apparatus 10. The cleaning process also typically functions to preheat the waste tires prior to placement in the reactor 2-2. The waste tires are placed into the reactor 2 in either a whole or cut condition. When cut, the cutting can be into large pieces, such as halves, quarters or eights, or can be shredded into much smaller pieces. The size of the whole or cut pieces of waste tires placed into the reactor 2 affects the rate of heat transfer into the tires during the pyrolysis processing. Accordingly, the whole and cut condition of the waste tires is a variable that is supplied to the control unit 5 in order to allow the control unit 5 to properly adjust the pyrolysis process as a function of the material supplied for pyrolysis. Heat transfer is a function of the density of the waste material. In one example, the reactor is of a size such that 100 loose tires are accommodated, 180 to 200 baled tires, 200 to 300 cut tires and 400 shredded tires. The more tires the higher the density and hence the longer the pyrolysis period. The number of tires can vary widely and is dependant upon the quantity of material desired in the injection stream. The size and number of the reactors is selected to supply the quantity of material desired in the injection stream.

While waste tires are a significant environmental problem, other waste materials may be processed by pyrolysis. For example, plastics and organic materials, frequently called "automobile fluff" remaining after the shredding of automobiles at automobile disposal sites provide a large amount of waste material. Similarly, hospital waste and other wastes are produced in large volumes and are readily processed by pyrolysis. In general all of these materials are carbon-based polymer waste including polymer waste, organic waste and similar pyrolyzable materials.

In one embodiment, a tire bailer is used to compress and bind bales of up to about 20 tires which are then loaded into the reactor chamber 2-2. For the batch processing pyrolysis apparatus 10, between about 180 and 270 tires are placed in the reactor chamber 2-2 per batch cycle, but this range may vary depending on the size of the tires and the size of chamber 2-2.

In one embodiment, the waste tires are cut into segments of approximately 15 cm by approximately 5 cm. The cutting step typically does not separate the reinforcing material of the tire from the other material. The cut segments thus form fragments of tires connected by reinforcing material but which generally can be considered bulk material.

The cleaning of the waste tires can be undertaken, if desired, to ensure that the pyrolysis char to be formed has a low content of ash. The washing water typically has a temperature of about 40° C. Another reason for the washing is to remove ice and snow in cold climates since any water will lead to the formation of steam and an uncontrolled increase of pressure in the pyrolysis chamber. In order to further ensure that moisture does not enter the pyrolysis chamber, the supply unit 1-2 dries the waste tires or fragments after washing. The drying is suitably carried out in a drying chamber with circulating drying air having a temperature of about 120° C.

In FIG. 9, the residue unit 1-3 functions to extract the solid residue remaining in the reactor after the heating and cooling of the pyrolysis processing is complete. Typically a vacuum system is used to remove the char and other residue. After removal of the residue, the residue is further processed to separate the char and other fine material from the steel and other large material.

In FIG. 9, the reactor 2 has a reactor chamber 2-2 for receiving the waste tire or other material prior to pyrolysis processing. The chamber 2-2 is surrounded by a heating chamber 2-1 that includes means for heating the reactor chamber 2-2 from room temperature up to 1000° C. or more. The chamber 2-2 includes insulating walls 2-3 necessary for safety, heating efficiency and for extraction of heat into the injection stream unit 6. Since the pyrolysis reactor 2 is designed for batch processing, the reactor chamber 2-2 typically includes a covered opening (not shown) which is opened when the reactor 2 is cool for inserting waste tires from supply unit 1-2, is closed during pyrolysis processing when the temperature is cycled up and then down and is reopened to remove the residue into residue unit 1-2 when the reactor is cool.

The heating unit 3 provides heat to the reactor 2. The source of the heat is burner 3-1 which burns fuel of any type, but in particular burns fuel recovered by the gas/liquid unit 4. The heated and combusted gases from burner 3-1 are injected into the reactor heating chamber 2-1 to heat the reactor pyrolysis chamber 2-1 and from there are exhausted to exhaust 2-4. The exhaust 2-4 in the FIG. 9 embodiment connects as an input to the injection stream unit 6 (ISU). In some embodiments, the heated and combusted gases from burner 3-1 are input to a heat exchanger 3-2. The heat exchanger 3-2 receives and heats gases from the gas input unit 4-4 of gas/liquid unit 4 that are then input directly to the reactor pyrolysis chamber 2-2. In some embodiments, when a heat exchanger is employed, the heated and combusted gases from burner 3-1 may all be used to transfer heat in the heat exchanger 3-2 and then exhausted directly with out being input to reactor 2. The heated pyrolysis gases from the pyrolysis chamber 2-2 are vented through pipes 2-6 through pipe 2-6A to the gas/liquid unit 4 or through pipe 2-6B to injection stream unit 6.

In FIG. 9, the gas/liquid unit 4 includes a condenser unit 4-1 that receives the pyrolysis gas through pipe 2-6A connected from the reactor chamber 2-2. The condenser unit 4-1 cools the pyrolysis gas to extract condensed liquid into the condensed liquid unit 4-2. The condenser unit 4-1 typically includes a water-cooled pre-condenser, a water-cooled heat exchanger, and a water-cooled main condenser. Water cooled in a water cooling tower is circulated by water pumps through the different water-cooled components of the condenser unit 4. The water is circulated by the pumps from the cooling tower through the main condenser, through the heat exchanger and finally through the pre-condenser and then back to the pumps. The excess heat from collected by the heat exchanger 4A that connects through pipe 4B to the injection stream unit 6.

In FIG. 9, pyrolysis apparatus 10 is typically controlled to direct the pyrolysis output in pipe 2-6 primarily to injection stream unit 6 for forming the injection stream. However, some component of the pyrolysis output can be directed to the condenser unit 4-1 for use in firing the reactor 2 or for other uses.

Typically, the main condenser in the condenser unit 4-1 is multi-staged for cracking the pyrolysis gas at different temperatures. For example, the first stage cools the pyrolysis gas to produce heavier oil fractions at temperatures near 350° C. The second stage cools the pyrolysis gas to produce medium heavy oils at temperatures between 100 and 350° C. The third stage cools the pyrolysis gas to produce light oils at temperatures under about 100° C.

The oil fractions of different weights which are condensed out are indicated as W1 through W3 in the condenser unit 4-1. The oils of different weights are stored by the condensed liquid unit 4-2 in collection tanks as recovered oil products. The remaining non-condensed pyrolysis gas, if any, is input from the condenser unit 4-1 to the uncondensed gas unit 4-3 which extracts gas products that are stored in suitable tanks. Additionally, part of the uncondensed gas is supplied to the gas input unit 4-4 for use in the pyrolysis process. Another part of the uncondensed gas is supplied to the burner 3-1 for heat generation through combustion.

The batch process in one embodiment of the FIG. 9 pyrolysis apparatus 10 runs for an eight-hour batch cycle including approximately 4 hours heating and 4 hours cooling. During the batch cycle, pyrolysis of the tires takes place in a closed system. After the tires are loaded and the reactor chamber 2-2 is sealed, the pyrolysis period begins under control of the control unit 5. First, air within the reactor chamber 2-2 is evacuated during an initial purging with nitrogen gas from the gas input unit 4-4. The inert atmosphere of nitrogen gas is used to prevent combustion from occurring in chamber 2-2. The pressure inside the reactor chamber 2-2 is slightly above atmospheric pressure (+0.5 psi). In one embodiment, the reactor chamber 2-2 is housed in the heating chamber 2-1 which is in the form of a furnace above four burners constituting the burner 3-1 of the heating unit 3. The burners are capable of initially burning diesel fuel, if necessary for start up, and then burn uncondensed gas or oil from the pyrolysis process.

As the batch of waste tires is heated the pyrolyzing tires emit pyrolysis gas. The pyrolysis gas passes from the pyrolysis chamber 2-2 through pipes 2-6 through pipe 2-6A to the gas/liquid unit 4 or through pipe 2-6B to injection stream unit 6. The output from the injection stream unit 6 in valved pipe 7 is the injection stream 13 that connects to the well head of an injection well.

The condenser unit 4-1 typically formed of three-stage, water-cooled condensation vessels where oil condenses out from the pyrolysis gas. After the condenser unit 4-1, the remaining gases pass to the uncondensed gas unit 4-3. The uncondensed gas unit 4-3 typically includes a wet scrubber to clean the gas before it is piped to the gas burner unit 3-1 to fuel the pyrolysis process.

The heating cycle continues until the internal reactor chamber 2-2 reaches a temperature of about 880° C. (1600° F.). Thereafter the reactor chamber 2-2 is allowed to begin the cooling cycle. As the reactor chamber 2-2 is cooling, it is once again purged with nitrogen gas from the gas input unit 4-4 and the gas that is released to the exhaust 2-4. Finally, the reactor chamber 2-2 is opened and the remaining carbon and steel are removed, separated, and placed in containers for further post pyrolysis processing.

A key feature of the pyrolysis process is that it is not labor-intensive, and it can be fully automated once the tires have been loaded into the reactor chamber 2-2. The system design relies heavily on automation under control of control unit 5 ensuring a high degree of safety, quality control and control of the components in the injection stream 13.

A series of sensors, thermocouples, interlocks, and mechanical devices allow the pyrolysis apparatus to operate safely within precisely controlled and timed temperatures and pressures. If any problems occur within the process, the pyrolysis unit will automatically shut down in a safe manner. The pyrolysis apparatus of FIG. 9 automatically shuts down in a safe condition in case of a power failure. In the case of a malfunction, the control unit identifies the source of the problem.

The pyrolysis apparatus 10 of FIG. 9 is intended to operate 24 hrs/7 days for 365 days per year. Assuming an average of 180 tires per batch run, 3 runs per day, 365 days per year, the pyrolysis apparatus 10 processes (recycles) 197,100 tires annually.

For operation giving priority to the gas/liquid unit 4 and based on operational records, it is estimated that after recycling 197,100 tires, 3,942,000 pounds of tires (assuming average tire weight is 20 lbs per tire) will be completely recycled within a year. This recycling rate produces 394 tons of gas (20% of recovered products), 552 tons of oil (28% of recovered products), 256 tons of steel (13% of recovered products), and 769 tons of char (carbon black) (39% of recovered products).

For operation giving priority to the injection stream unit 6, it is estimated that after recycling 197,100 tires, 3,942,000 pounds of tires (assuming average tire weight is 20 lbs per tire) will be completely recycled within a year. This recycling rate produces 315 tons of gas (16% of recovered products), 1202 tons of oil (61% of recovered products), 256 tons of steel (13% of recovered products), and 197 tons of char (carbon black) (10% of recovered products).

The recovered oil products include 2.5A, 2.5B and 2.5C oil.

Approximately one-fifth to three-fifths of the recovered combustible methane/hydrogen gases, when the operation gives priority to the injection stream unit 6, are consumed by combustion in the burner 3-1 during the pyrolytic heating process. As the sensor on the pyrolysis gas vapor transfer line from the reactor indicates the presence of sufficient combustible gases to fire the burners, the initial oil burners are shut down and the gas burners are ignited. The combustible gases pass through a wet scrubber and a water vapor trap in the uncondensed gas unit 4-3 prior to use. Although a flare stack is provided in the system of FIG. 9, it is not normally used since gases are combusted and therefore consumed during the heating process in the burner 3-1 of the heating unit 3. For operation giving priority to the injection stream unit 6, the gas not required for the burner 3-1 is used for the injection stream unit 6.

The recovered char or carbon black is used in forming the injection stream or is readily sold. Further processing of the char or carbon black into small nanometer sizes (generally about 100 nanometers or below) greatly enhances the efficacy of the injection stream.

For operation giving priority to the injection stream unit 6, the unburned scrubbed gas, the excess heat produced by the reactor heating and cooling processes and $CO_2$-rich air from the pyrolysis apparatus 10 is used in the injection stream unit 6. In the pyrolysis apparatus 10, substantially all of the excess heat and all of the gas emissions are collected in the injection stream unit 6. Accordingly, essentially no atmospheric emissions occur.

Since the batch processing occurs in the absence of oxygen and at very high temperatures, tire pyrolysis produces very little waste. Historically, hazardous air pollutants (HAPs) have been the largest environmental concern with continuous process (as distinguished from batch process) tire pyrolysis plants. These emissions are eliminated with the batch process since the off-gases are scrubbed and used as described above in injection stream unit (ISU) 6.

The largest sources of air emissions are associated with the fuel for burner 3-1. The burner 3-1 is initially fueled with heating oil, if necessary and later with methane/hydrogen gas derived from the pyrolysis process. Air emissions from burning oil and methane have been calculated on the quantities of fuel (oil and gas) consumed during the recycling of 197,100 tires.

Since pyrolysis occurs in an oxygen-free atmosphere, the ash produced stays mixed with the char remaining in the reactor and can be diverted to the injection stream unit 6.

Incomplete pyrolyzed materials are avoided or if present are reprocessed until fully pyrolyzed. Control unit 5 monitors the reactor temperature to prevent incompletely pyrolyzed materials from forming during pyrolysis.

In FIG. 9, the pyrolysis apparatus 10 includes numerous temperature (T) sensors, gas chromatography sensors (C) and flow sensors (F) for monitoring and providing data for controlling the pyrolysis process and the injection stream process. These sensors are generally everywhere present in the system and the typically locations are shown with one or more of the letters "T", "C" or "F" in a circle. These sensors are typically connected to the control unit 5 and provide information to assist in control of the pyrolysis process. Additionally, each of the units in FIG. 9 receives control injections from the control unit 5 and provides status and other information to control unit 5.

Figure 10:
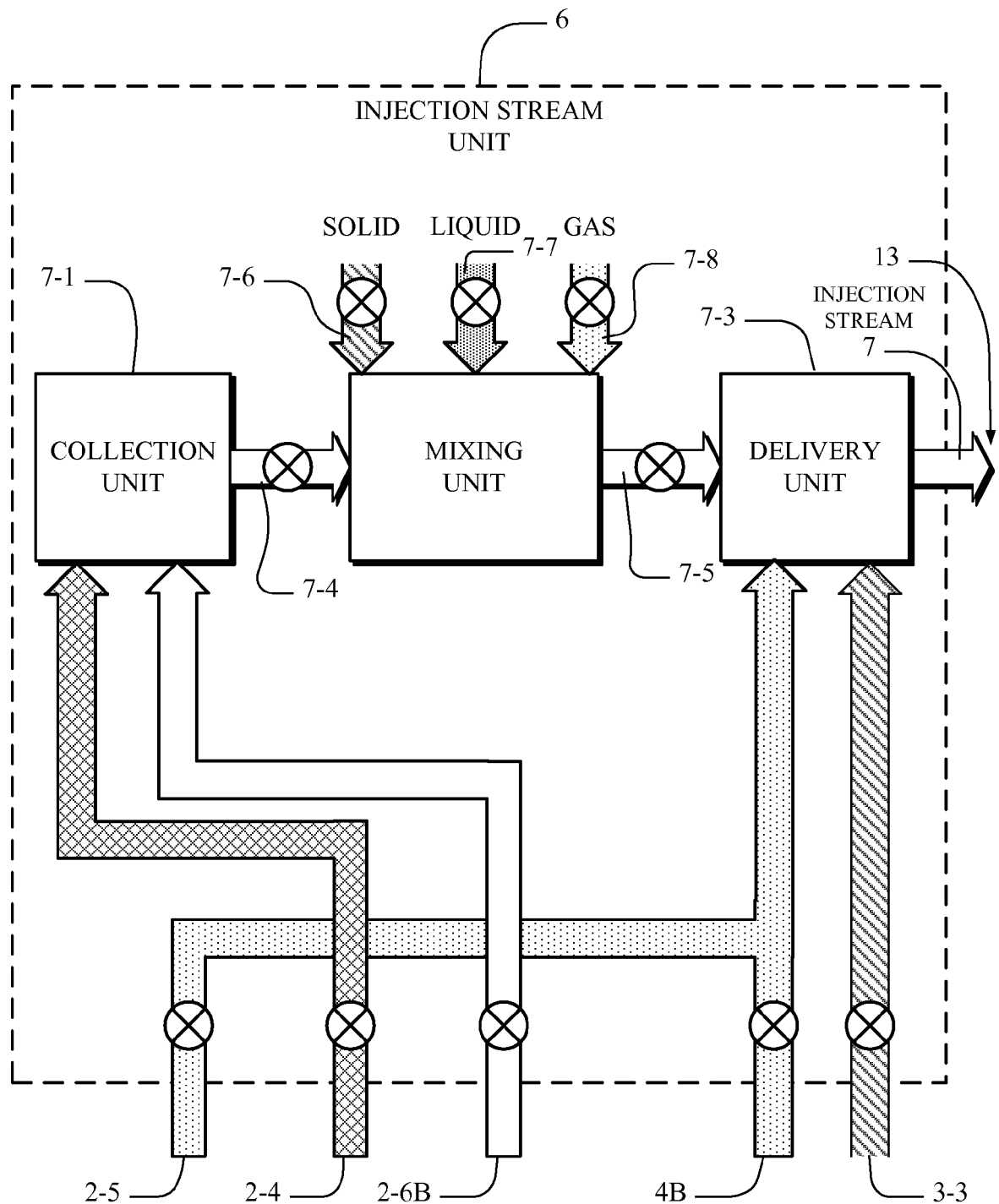
FIG. 10 depicts a schematic representation of one example of an injection stream unit used in the pyrolysis apparatus of FIG. 9.

In FIG. 10, injection stream unit 6 of FIG. 9 is shown in further detail. The purpose of the injection stream unit 6 is to prepare a mixture of components to form an injection stream that is optimized for injection into the injection well. The injection stream unit 6 includes of a collection unit 7-1 that collects materials from the reactor 2 and is connected to a mixing unit 7-2 that is used to optimize the composition of the injection stream, and a delivery unit 7-3 where the injection stream components are raised to temperatures and pressures for supplying the injection well. The collection unit 7-1 receives and premixes the exhaust gas input 7-4 and the pyro-gas input 2-6B. The mixing unit 7-2 receives the premixed gas through valved pipe 7-4. The mixing unit 7-2 also receives the solid valved input 7-6, the valved liquid input 7-7 and the valved gas input 7-8. The solid valved input 7-6 receives solids such as inorganic materials including carbon char as described in connection with TABLE 3 and TABLE 4. The valved liquid input 7-7 receives liquids including processed pyro-oil and other liquids such as liquids containing dissolved inorganic metals. The valved gas input 7-8 receives gases including processed pyro-gas, combustion gases, CO, $CO_2$, sulfur containing hydrocarbons and other by-products derived from the pyrolysis process and other gases such as vapor-phase metals. The gases may also include helium, nitrogen, and hydrocarbon gasses. The liquids can also include solubilizing agents such as sulfur containing hydrocarbons and other by-products derived from the pyrolysis process, and inorganic solids such as post-processed char that has been externally milled or modified. The mixing unit 7-2 mixes the premixed gas with solid, liquid and gas inputs. The mixing unit mixes the inputs primarily base upon the turbulence of the inputs and can have, if desired further mixing elements. The delivery unit 7-3 receives the mixed stream on valved pipe 7-5. The delivery unit 7-3 is heated by the heat from the valved pipes 2-5 and 4B and by the external heat source on valved pipe 3-3. The output from the delivery unit is the injection stream 13 in output pipe 7.

Figure 11:
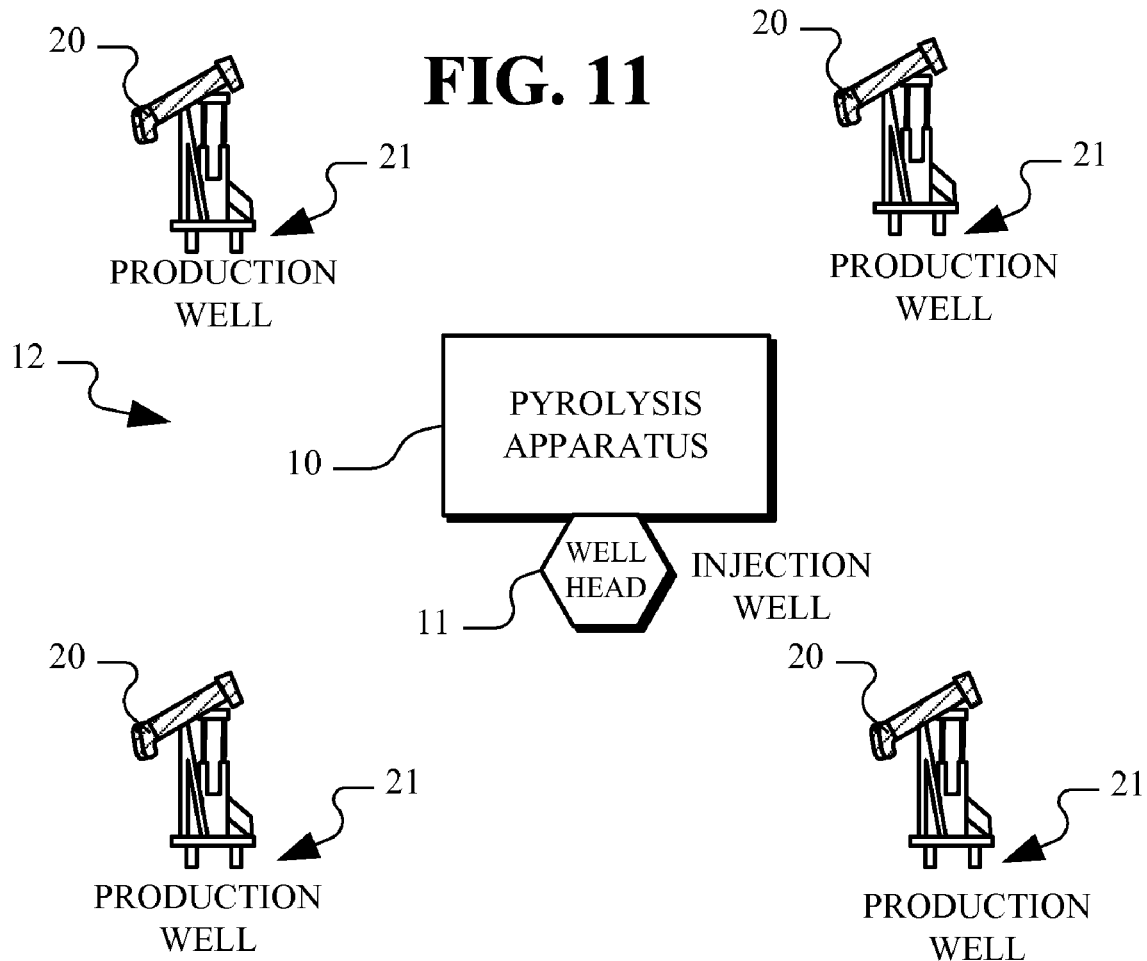
FIG. 11 depicts a schematic representation of enhanced oil recovery in an oil field including a pyrolysis apparatus connected to a well head and including four production wells.

In FIG. 11, an oil field 12 includes a pyrolysis apparatus 10 connected to a well head 11 and including a four production wells 21 having pumps 20. The configuration of the pyrolysis apparatus 10, well heads 11 and production wells 21 is merely for purposes of explanation. Actual configurations will vary and depend heavily on the nature of the oil field 12 including the number and placement of existing production wells 21. The injection well 11 can be located at preexisting production well 21 or can be newly added for purposes of injection. Also, the injection well 11 and a production well 21 may be co-located and use the same pipe.

Figure 12:
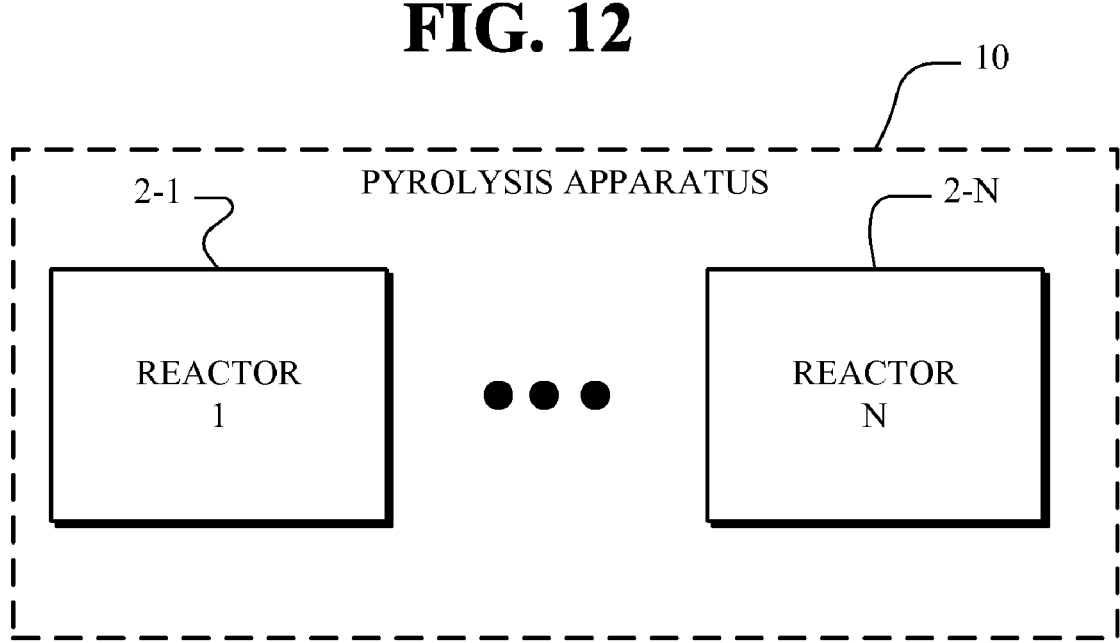
FIG. 12 depicts a schematic representation of a pyrolysis apparatus including a plurality of reactors.

In FIG. 12, a schematic representation of a pyrolysis apparatus 10 including a plurality of reactors 2 including reactors 2-1, . . . , 2-N is shown. The number of reactors 2 id selected to satisfy the needed capacity of the injection stream 13 (see FIG. 1).

Figure 13:
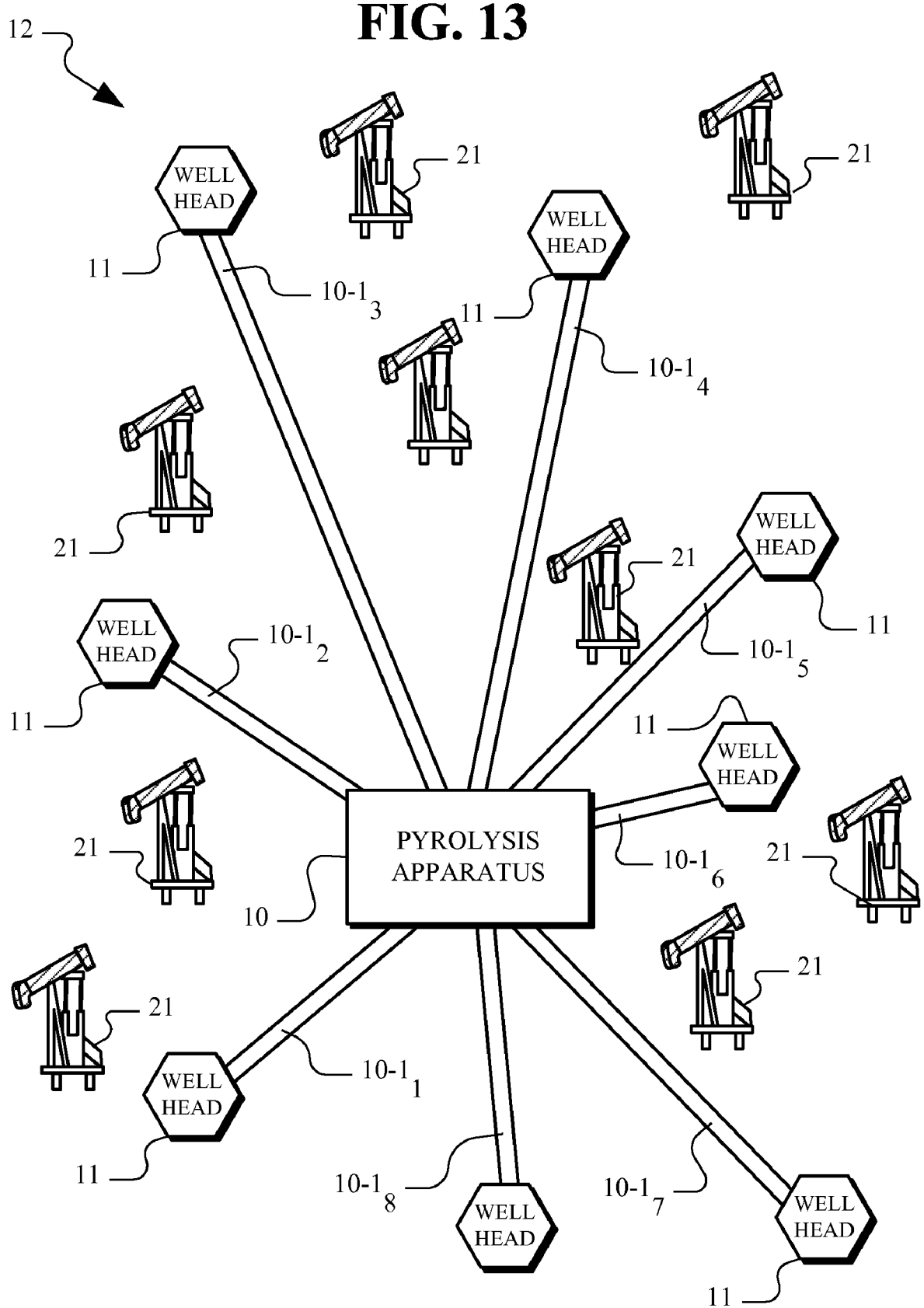
FIG. 13 depicts a schematic representation of enhanced oil recovery in an oil field including a pyrolysis apparatus connected to a plurality of well heads and including a plurality of production wells.

In FIG. 13, a schematic representation of enhanced oil recovery in an oil field 12 including a single pyrolysis apparatus 10 connected by pipes 10-1 to a plurality of well heads 11 and including a plurality of production wells 21 is shown. The pipes 10-1 include the eight pipes 10-1$_1$, 10-1$_2$, . . . , 10-1$_8$ each connected to a different well head of a different well. The configuration of the pyrolysis apparatus 10, well heads 11 and production wells 21 is merely for purposes of explanation. Actual configurations will vary and depend heavily on the nature of the oil field 12 including the number and placement of existing production wells 21. The injection wells 11 can be located at preexisting production wells 21 or injection wells 11 can be newly added for purposes of injection.

Figure 14:
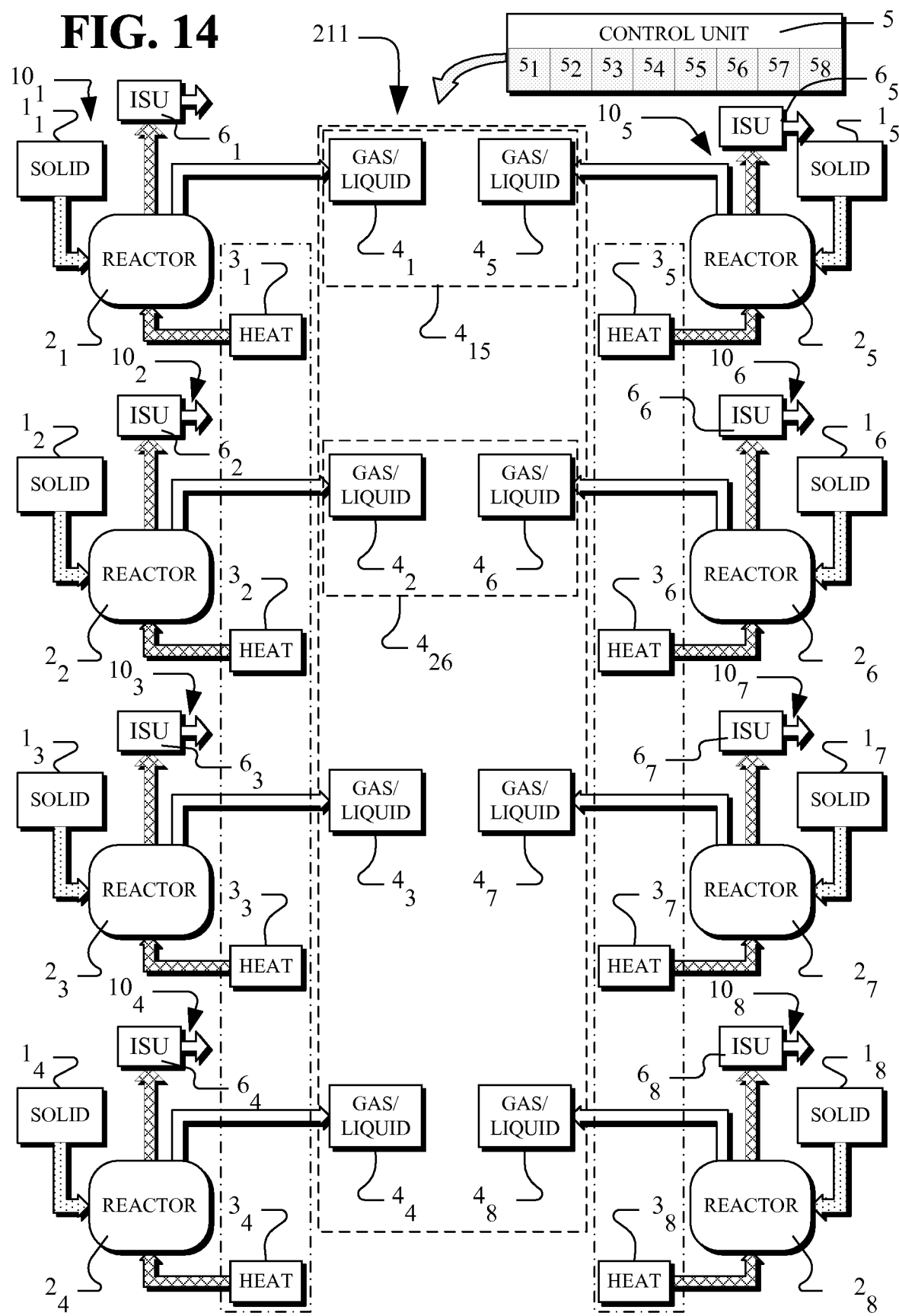
FIG. 14 depicts a pyrolysis apparatus including eight reactors.

In FIG. 14, a pyrolysis apparatus array 211 includes eight batch pyrolysis apparatuses 10 of the FIG. 9 type including the pyrolysis apparatuses 10$_1$, 10$_2$, . . . , 10$_8$. The batch pyrolysis apparatuses include the solid processing units 1$_1$, 1$_2$, . . . , 1$_8$, include the reactors 2$_1$, 2$_2$, . . . , 2$_8$, include the heating units 3$_1$, 3$_2$, . . . , 3$_8$, include the gas/liquid units 4$_1$, 4$_2$, . . . , 4$_8$, include the injection stream units (ISU) 6$_1$, 6$_2$, . . . , 6$_8$, and the control unit 5 having the control units 5$_1$, 5$_2$, . . . , 5$_8$ all associated with the pyrolysis apparatuses 10$_1$, 10$_2$, . . . , 10$_8$, respectively.

FIG. 14, each of the pyrolysis apparatuses 10 includes numerous temperature (T) sensors, gas chromatography sensors (C) and flow sensors (F) for monitoring and providing data for controlling the pyrolysis process in each of the separate reactors 2. As indicated in connection with FIG. 9, these sensors are generally everywhere present in the system and are connected to the control unit 5 and provide information to assist in control of the pyrolysis processes. Additionally, each of the units, as in FIG. 9, receives control injections from the control unit 5 and provides status and other information to control unit 5.

In FIG. 14, each of the reactors 2, including the reactors 2$_1$, 2$_2$, . . . , 2$_8$ separately completes a batch pyrolysis processing cycles. While separate heating units 3 and gas/liquid units 4 may be used in the array, economies of scale are provided when the reactors share parts of the heating and gas/liquid units. In one example, gas/liquid units 4$_1$ and 4$_5$ are replaced with a single gas/liquid unit 4$_{15}$ and gas/liquid units 4$_2$ and 4$_6$ are replaced with a single gas/liquid unit 4$_{26}$. Such combinations are by way of example, as any combination of the gas/liquid units and/or the heating units is possible.

In FIG. 14, the injection stream units 6, including the injection stream units (ISU) 6$_1$, 6$_2$, . . . , 6$_8$, prepare mixtures of components to form injection streams that are optimized for injection into the one or more injection wells. Each injection stream unit 6 includes as shown in FIG. 10, a collection unit 7-1, that collects materials from the corresponding reactor 2 (for example reactors 2$_1$, 2$_2$, . . . , 2$_8$ correspond to injection stream units (ISU) 6$_1$, 6$_2$, . . . , 6$_8$, respectively) and is connected to a mixing unit 7-2 that is used to optimize the composition of the injection stream, and a delivery unit 7-3 where the injection stream components are raised to temperatures and pressures for supplying the injection well. The injection stream units 6 operate in the same manner as described in connection with FIG. 10.

Figure 15:
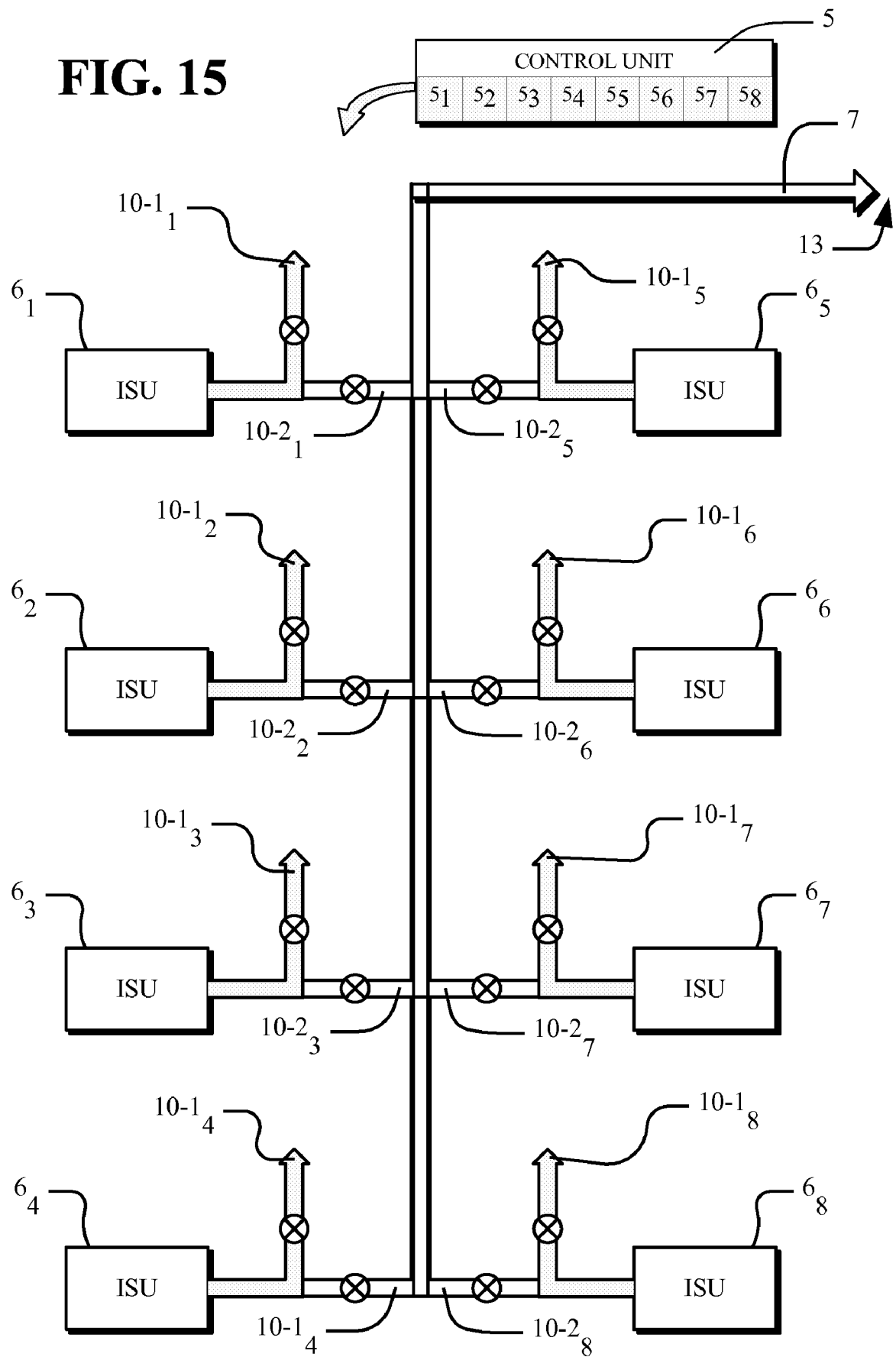
FIG. 15 depicts a configuration of the injection stream units in the pyrolysis apparatus of FIG. 14.

FIG. 15, depicts a configuration of the injection stream units 6 in the pyrolysis apparatus array 211 of FIG. 14. The injection stream units (ISU) 6$_1$, 6$_2$, . . . , 6$_8$ have valved output pipes 10-1 including the eight valved pipes 10-1$_1$, 10-1$_2$, . . . , 10-1$_8$, respectively, that in on embodiment are the eight pipes 10-1$_1$, 10-1$_2$, . . . , 10-1$_8$ of FIG. 13. The injection stream units (ISU) 6$_1$, 6$_2$, . . . , 6$_8$ additionally have valved output pipes 10-2 including the eight valved pipes 10-2$_1$, 10-2$_2$, . . . , 10-2$_8$, In one embodiment, the eight valved pipes 10-2$_1$, 10-2$_2$, . . . , 10-2$_8$ connect in common to the single pipe 7 that forms a single injection stream. The valves in the pipes 10-1$_1$, 10-1$_2$, . . . , 10-1$_8$ and in the pipes 10-2$_1$, 10-2$_2$, . . . , 10-2$_8$ are controlled by control unit 5. By sequencing the reactors 2 of FIG. 14 and controlling the valves in FIG. 15, the injection stream from pipe 7 can be continuous, if desired, even when the individual reactors 2$_1$, 2$_2$, . . . , 2$_8$ are operated in the batch mode. The FIG. 15 configuration is merely one example as any combination of two or more of the pipes 10-2$_1$, 10-2$_2$, . . . , 10-2$_8$ can be combined rather than combining all outputs for a single injection stream. Similarly, the number of two or more of the reactors 2$_1$, 2$_2$, . . . , 2$_8$ in the FIG. 14 pyrolysis apparatus array 211 can be used, not all eight (or more) need be used.

In FIG. 14 and FIG. 15, the control unit 5 operates to sequence the pyrolysis apparatuses 10 and the valves of pipes 10-2$_1$, 10-2$_2$, . . . , 10-2$_8$ and of pipes 10-2$_1$, 10-2$_2$, . . . , 10-2$_8$ so that one or more of the batch pyrolysis reactors 2 is operating in a pyrolysis period whereby the array 211 is in continuous pyrolysis operation or in batch operation with any frequency desired.

Figure 16:
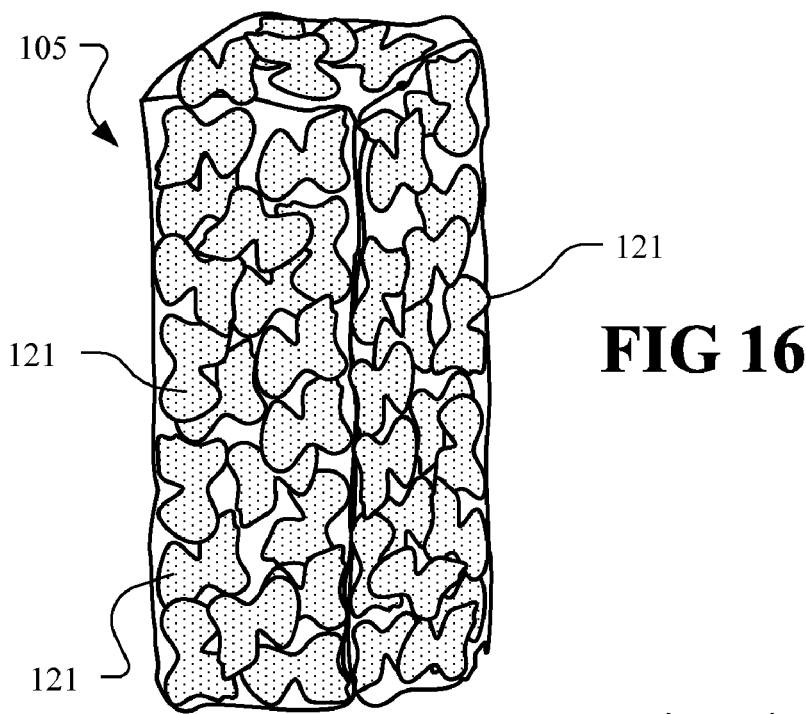
FIG. 16 is a schematic representation of pyro-material formed of particles including composites having nanoclusters.

In FIG. 16, the material 105 includes nanomaterial in the form of particles 121 derived from char in the manner previously described. Typically, the char is processed for size reduction, sorting, classification and other attributes to form the char particles 121.

Figure 17:
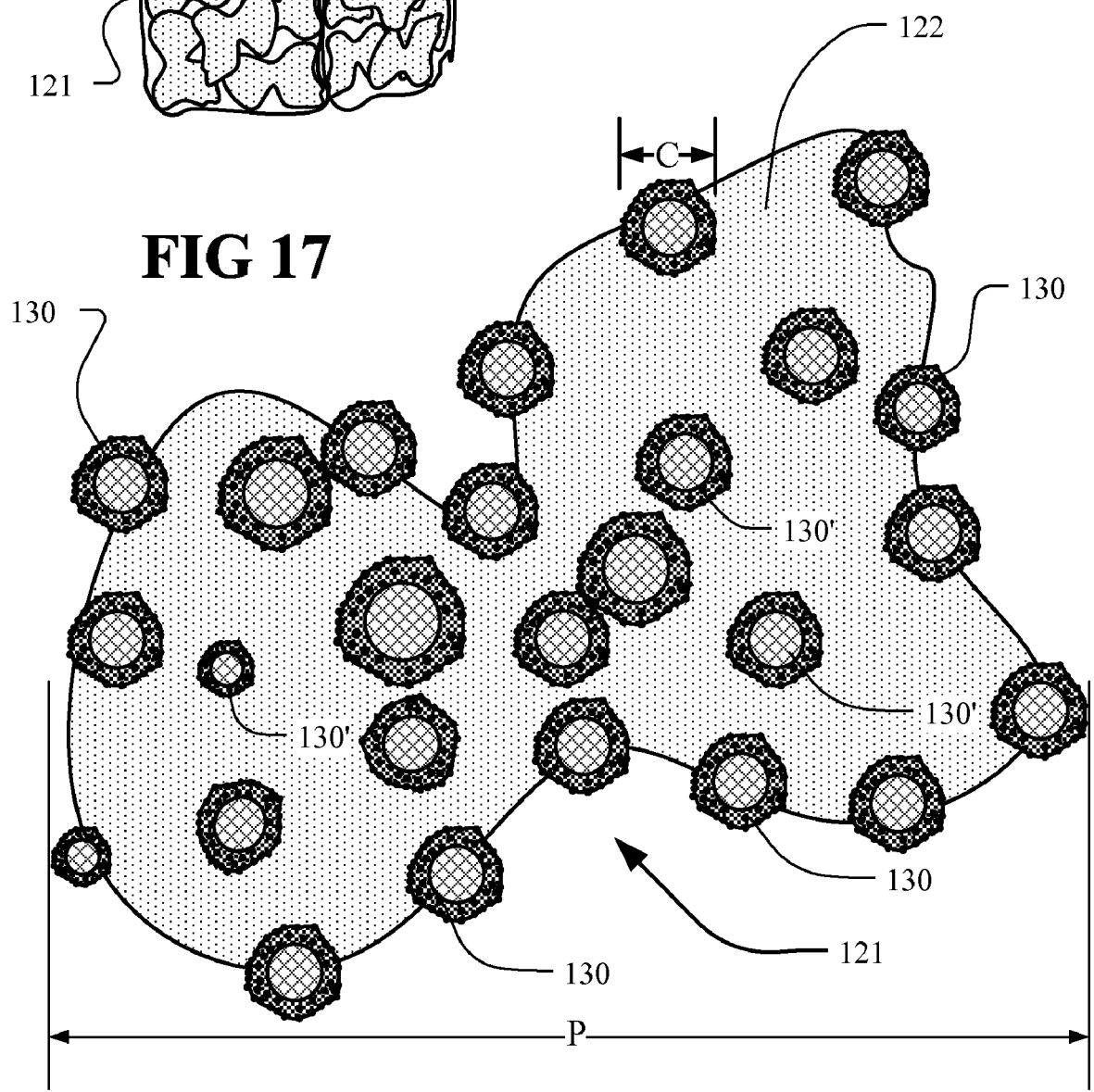
FIG. 17 depicts a schematic representation of a typical particle of the FIG. 16 material including composites having nanoclusters.

In FIG. 17, a schematic representation of a particle 121 is shown that is typical of the particles 121 in the material 105 of FIG. 16. In embodiments where the material 105 is used in an injection stream, the particles 121 of FIG. 17 typically have at least one dimension, P, in a range from approximately 10 nm to approximately 10,000 nm. In FIG. 17, the particle 121 includes a plurality of clusters 130 that are held together by a cluster binder 122. The material of the cluster binder 122 primarily contains components of TABLE 3 and TABLE 4.

In the particle 121, a number of the clusters 130 are externally located around the periphery of the particle 121 and a number of the clusters 130, designated as clusters 130', are located internally away from the periphery of particle 121. The internally located clusters 130' are loosely encased by the cluster binder material 122. The selection of particle sizes in a range from approximately 50 nm to approximately 1000 nm tends to optimize the number of active and externally located clusters 130 and thereby enhances the chemical operations.

Figure 18:
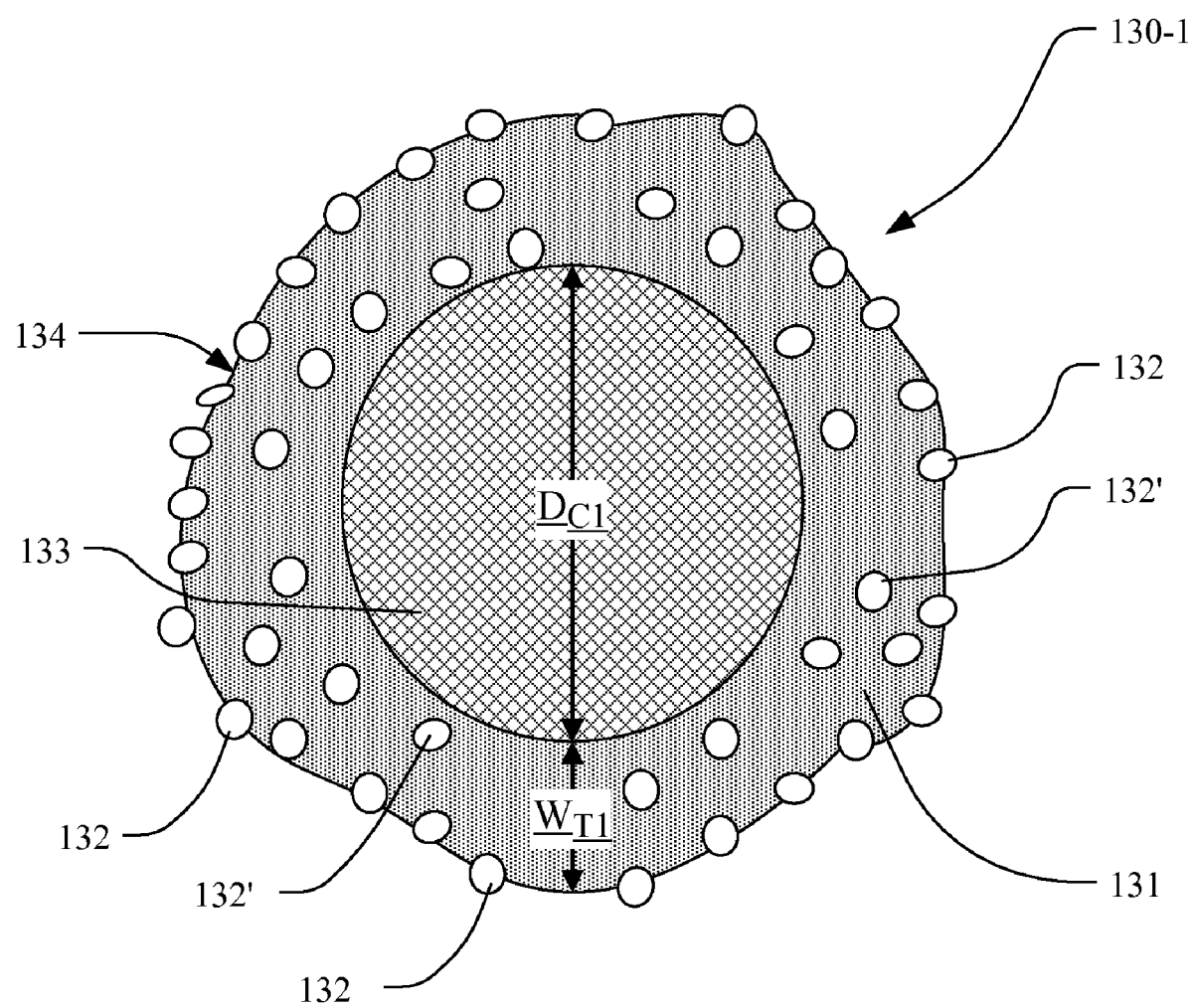
FIG. 18 depicts a schematic representation of a typical composite having nanoclusters.

In FIG. 18, a schematic representation is shown of a cluster 130-1 that is typical of one embodiment of clusters 130 of FIG. 17. The cluster 130-1 has a carbon nanosphere core 133 encased by a composite layer 134. The carbon nanosphere core 133 is generally spherical in shape (a nanosphere) and has a core diameter, $D_{C1}$, in a range from approximately 10 nanometers to approximately 1000 nanometers. The composite layer 134 has a wall thickness, $W_{T1}$, in a range from approximately 0.2 nanometers to approximately 300 nanometers. The overall diameter of the cluster 130-1 ($D_{C1}+W_{T1}$) in a range from approximately 10 nanometers to approximately 1300 nanometers.

In FIG. 18, the size and shape of the carbon nanosphere cores 133 are limited primarily by the size and the shape of the cores used in the mixture forming the "green" tires as indicated in TABLE 3. The melting point of graphite is approximately in the range from 1900° C. to 2800° C. Since both the vulcanization and the pyrolysis processes operate at much lower temperatures, the carbon nanosphere cores 133 in finished tires and in tire char remain essentially undisturbed from their original size and shape.

In FIG. 18, the composite layers 134 surrounds and incases the carbon nanosphere cores 133. The sizes and the shapes of the composite layers 134 are determined in part by the sizes and the shapes of the carbon nanosphere cores 133 and additionally by the processing of the tire char. The processing of the char is done so as to achieve the 0.2 nanometers to approximately 1200 nanometers for the wall thickness, $W_{T1}$, and so as to achieve the overall diameter, ($D_{C1}+W_{T1}$), of the clusters 130-1 in a range from approximately 10 nanometers to approximately 1300 nanometers.

In FIG. 18, the composite layer 134 is carbon and contains a mixture of metal oxides and metal sulfides referred to as pyro-char of TABLE 4 and other materials as described in TABLE 3, surrounding and bound to the carbon nanosphere core 133. Specifically, the composite layer 134 includes metal sulfide nanoclusters 132 embedded in and forming part of the composite layer 134. A number of the nanoclusters 132 are externally located, that is, located around the periphery of the cluster 130-1 and a number of the nanoclusters 132, designated as nanoclusters 132', are located internally away from the periphery of the composite layer 134. The composition of the composite layer 134 typically has components of TABLE 3 in a range, for example, of up to 100% by weight, and carbon and other components.

The nanomaterial 105 is formed of a plurality of nanocomponents including nanoparticles 121, in turn formed of conductive carbon-based clusters 130 bound together by a conductive carbon-based cluster binder 122 including components of TABLE 3 all having high densities of mobile charge carriers (electrons, electronic acceptors, ionic species).

The nanomaterial 105, and each of the nanocomponents, plays a key role in the process of charge transport including supplying electrons and electron acceptor sites in the ground 30 including ground regions 30-5 through 30-15 and particularly the barrier regions 30-10 and 30-13 (see FIG. 1 through FIG. 8). The charge transport occurs by the electron travel through the highly conductive and relatively short path of the binders 122, 31 and 141 with proximity to the nanoclusters 132 and 142. The small sizes of the particles 121 provide large surface areas. In general, particle sizes of less than about 100 nanometers are preferred in order to have large surface areas which provide ready access to the ground 30 including ground regions 30-5 through 30-15 and particularly the barrier regions 30-10 and 30-13 (see FIG. 1 through FIG. 8). The combination of the high density of available electrons in all the nanocomponents of the particles 121 with the short distances among all the nanocomponents of the particles 121 and the large surface areas of the nanocomponents greatly enhances the permeability of ground oil, such as 30-9, 30-12 and 30-14, and new oil 15.

The electron transfer can occur through the release of chemical energy to create an internal voltage and heat. Such chemical reactions where electrons are transferred between atoms or molecules are called oxidation/reduction or redox reactions. Oxidation and reduction reactions can be separated in space and time.

Figure 19:
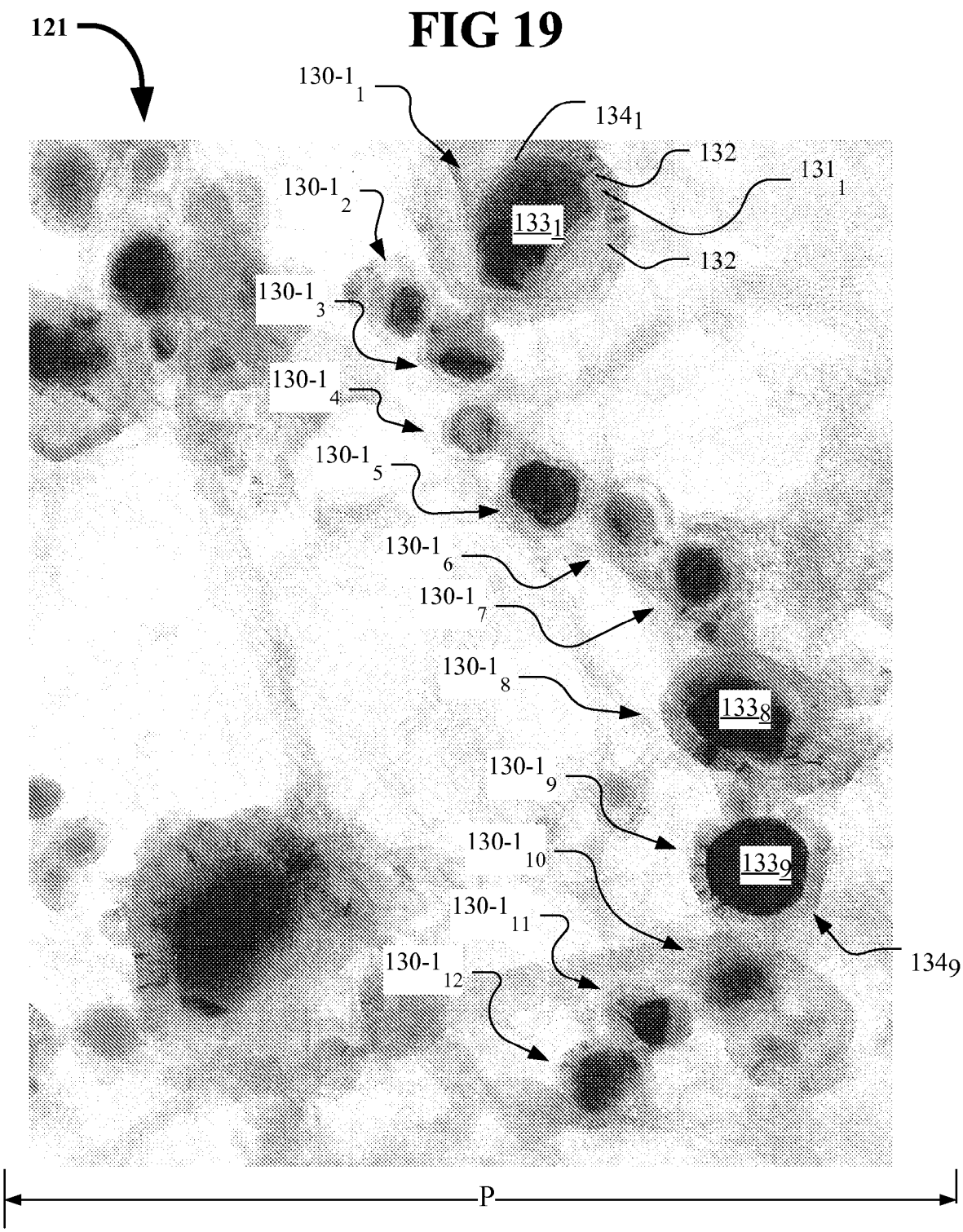
FIG. 19 depicts an electron-microscope scan of a particle including composites having nanoclusters.

FIG. 19 depicts an electron-microscope scan of a particle 121 including composites having nanoclusters. The particle 121 has a dimension P that is typically less than 100 nanometers, approximately $1 \times 10^{-7}$ meters. The electron-microscope scan of FIG. 19 was produced with 60,000× magnification using a Transmission Electron Microscope with a scan time of approximately one minute. A slide was prepared by dissolving 1 milligram of material into 20 milliliters of methanol in a scintillation vial, sonicating for 105 minutes and placing a 70 micro liter aliquot drop onto a TEM copper grid for imaging. The grid is then covered and placed in an environmental chamber to evaporate the methanol. The example of FIG. 19 is typical of many samples.

In FIG. 19, a plurality of clusters 130-1 are shown, including among others clusters $130\text{-}1_1$, $30\text{-}12$, $130\text{-}1_3$, $130\text{-}1_4$, ..., $130\text{-}1_{12}$. By way of example, the cluster $130\text{-}1_1$ includes a carbon nanosphere core $133_1$ surrounded by a composite layer $134_1$ having a large number of nanoclusters 132 (only two of which are labeled but includes many more as a function of the packing density) held together by a nanocluster binder $31_1$. Each of the others clusters $130\text{-}1_1$, $30\text{-}12$, $130\text{-}1_3$, $130\text{-}1_4$, ..., $130\text{-}1_{12}$ has similar structures.

In FIG. 19, the plurality of nanoclusters $130\text{-}1_1$, $30\text{-}12$, $130\text{-}1_3$, $130\text{-}1_4$, ..., $130\text{-}1_{12}$ are arrayed in a structure that couples the nanoclusters 130-1 for energy transfer (electrical, thermal, mechanical and other). It is evident in FIG. 19 that nanoclusters $130\text{-}1_1$, $30\text{-}12$, $130\text{-}1_3$, $130\text{-}1_4$, ..., $130\text{-}1_{12}$ are linked together to form a serial chain whereby the composite layer 134 of one cluster are in close proximity to the composite layer 134 of one or more adjacent nanoclusters. With such close proximity of composite layers 134, energy transfer is readily facilitated from adjacent to adjacent nanoclusters. It is highly desirable to have linking of nanostructures to provide the enhanced performance that derives from efficient electrical coupling and charge transport. The linking is achieved by close proximity binding of the clusters with conductive composite binders. The linking is further enhanced by the structure of the nanoclusters based upon carbon nanocores encased in a conductive carbon-based nanocluster binder. This linking is achieved as a result of the control of char formation in tire pyrolysis. This linking in the present invention is superior to nanotube technology where the linking is not in-situ provided, but must be added at great expense and with high difficulty.

FIG. 19 is a planar view of a thin plane of nanomaterial representing a monolayer of material, but it should be noted that the close proximity of the composite layers 134 occurs in three dimensions of a volume of material.

The close proximity of composite layers 134 and the resultant high energy transfer characteristics of the nanomaterials are determined as a function of the processing times, temperatures and pressures during pyrolysis of tires.

Figure 20:
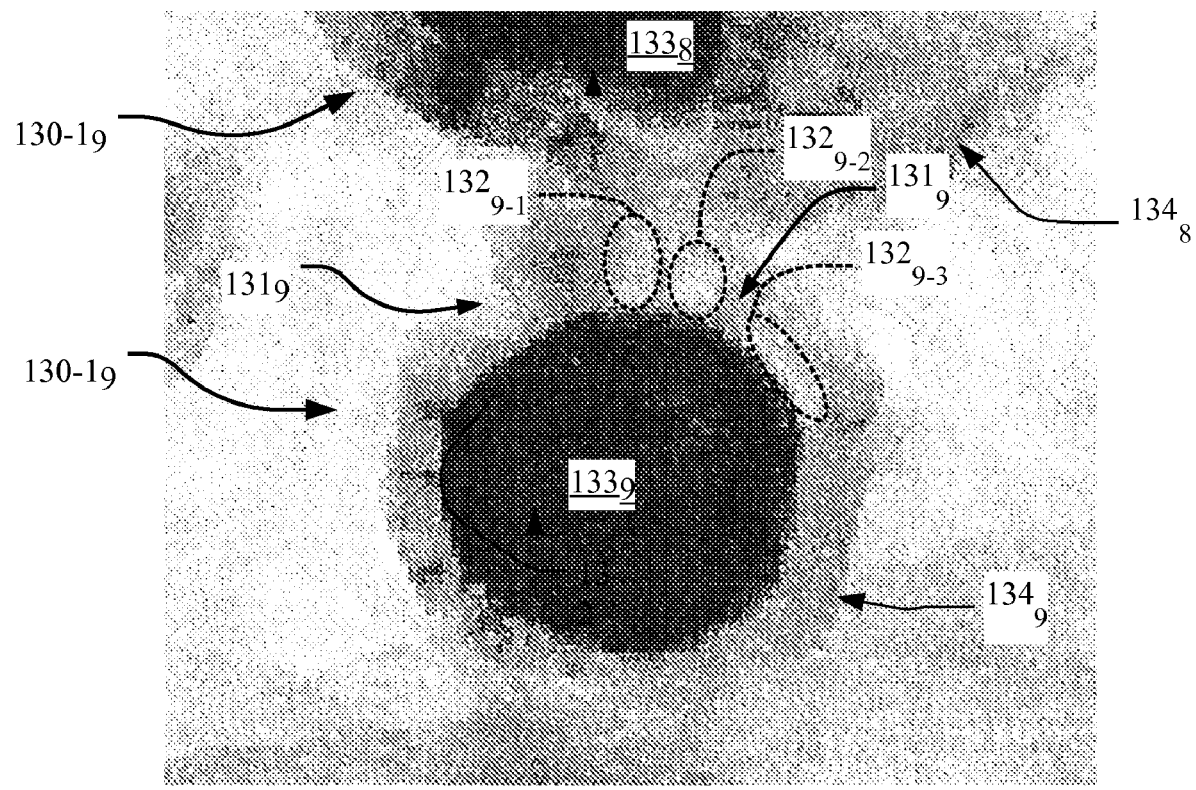
FIG. 20 depicts an electron-microscope scan of one of the nanoclusters of FIG. 19.

FIG. 20 depicts an enlarged view of a portion of the electron-microscope scan of the cluster $130\text{-}1_9$ adjacent to and in close proximity to the cluster $130\text{-}1_8$ of FIG. 19. The composite layers $134_8$ and $134_9$ of clusters $130\text{-}1_8$ and $130\text{-}1_9$ are in close proximity. The cluster $130\text{-}1_9$ includes, by way of example, nanoclusters $132_{9\text{-}1}$, $132_{9\text{-}2}$ and $132_{9\text{-}3}$. The nanoclusters $132_{9\text{-}1}$, $132_{9\text{-}2}$ and $132_{9\text{-}3}$ are bound together in the composite layer $134_9$ by the nanocluster binder $31_9$. The zinc sulfide properties of the nanoclusters $132_{9\text{-}1}$, $132_{9\text{-}2}$ and $132_{9\text{-}3}$ are identified by in-situ x-ray backscattering images observed during the scan. Other materials present (not shown in FIG. 20) include many of the materials of TABLE 3. The pyrolitic carbon in the composite 134 facilitates the ion formation and charge transport. The other materials of TABLE 3 also play a contributing role to the operation.

Figure 21:
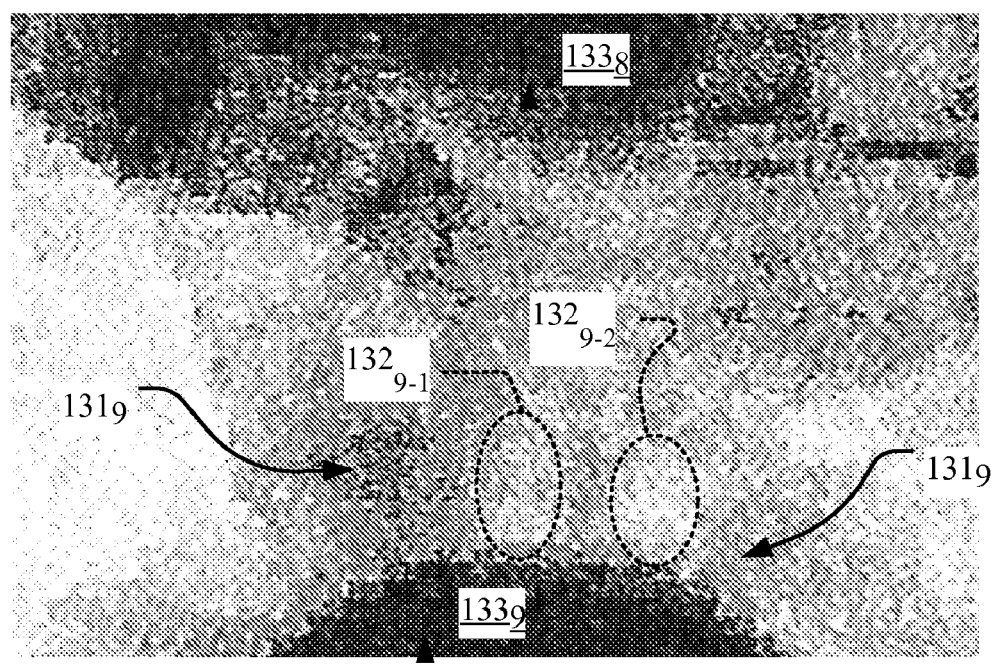
FIG. 21 depicts an enlarged electron-microscope scan of a portion of FIG. 20.

FIG. 21 depicts an enlarged electron-microscope scan of a portion of FIG. 20.

While the invention has been particularly shown and described with reference to preferred embodiments thereof it will be understood by those skilled in the art that various changes in form and details may be made therein without departing from the scope of the invention.

The invention claimed is:

1. A method of enhanced oil recovery comprising,
   thermal processing polymer-based waste at temperatures higher than approximately 200° C. to produce organic and inorganic processed materials,
   injecting the organic and inorganic materials as an injection stream into the ground to liberate ground oil,
   withdrawing the liberated ground oil from the ground.

2. The method of claim 1 wherein the injection stream interacts with the ground oil to form a new oil.

3. The method of claim 2 wherein the step of withdrawing withdraws the new oil including the ground oil.

4. The method of claim 1 wherein the thermal processing step is performed in proximity to an injection well site.

5. The method of claim 1 wherein the injection stream and the ground oil form a new oil that permeates one or more barrier regions that impede the permeation of ground oil.

6. The method of claim 5 wherein the injection stream elevates the temperature of the new oil relative to the ground oil to enable permeation of the new oil through the one or more barrier regions.

7. The method of claim 5 wherein the injection stream elevates the temperature of the new oil whereby the new oil has a decreased viscosity relative to the ground oil before and after the one or more barrier regions.

8. The method of claim 1 wherein the injection stream elevates the temperature of the ground oil.

9. The method of claim 1 wherein the injection stream and the ground oil are miscible.

10. The method of claim 1 wherein the injection stream is injected into the ground with an elevated pressure whereby the injection stream and the ground oil form a new oil for causing the new oil to permeate one or more barrier regions.

11. The method of claim 1 wherein the injection stream has adjustable parameters including temperature, pressure and miscibility for increasing the permeability of the ground oil.

12. The method of claim 11 wherein the ground oil is bound to one or more ground regions with an adhesion force and wherein one or more of the adjustable parameters of the injection stream causes the adhesion force to be overcome.

13. The method of claim 1 wherein the injection stream is substantially free of water.

14. The method of claim 1 wherein the thermal processing step and the injecting step are performed at an oil field in proximity to an injection well.

15. The method of claim 1 wherein the thermal processing step and the injecting step are performed at an oil field in proximity to an injection well and wherein the withdrawing step is performed at production wells at the oil field.

16. A method of enhanced oil recovery comprising,
    thermal processing polymer-based waste, wherein the waste is tires, to produce organic and inorganic processed materials,
    injecting the organic and inorganic materials as an injection stream into the ground to liberate ground oil,
    withdrawing the liberated ground oil from the ground.

17. A method of enhanced oil recovery comprising,
    thermal processing polymer-based waste to produce organic and inorganic processed materials, wherein the thermal processing step is performed with a pyrolysis apparatus,
    injecting the organic and inorganic materials as an injection stream into the ground to liberate ground oil,
    withdrawing the liberated ground oil from the ground.

18. The method of claim 17 wherein the pyrolysis apparatus includes a plurality of reactors.

19. The method of claim 17 wherein the pyrolysis apparatus includes one or more batch processing reactors.

20. A method of enhanced oil recovery comprising,
    thermal processing tire waste to produce organic and inorganic processed materials including solids, liquids and gases,
    injecting at least the liquids and gases of the organic and inorganic materials as an injection stream into the ground to liberate ground oil,
    withdrawing the liberated ground oil from the ground.

21. The method of claim 20 wherein the solids include carbon and inorganics, wherein the liquids are organics including aromatics, aliphatics and olefenics and including sulfur-bearing, oxygen-bearing and nitrogen-bearing analogs thereof and wherein the gases include hydrocarbon gases, combustion gases and hydrogen and sulfur-bearing, oxygen-bearing and nitrogen-bearing analogs thereof 22. The method of claim 20 wherein the thermal processing step is pyrolysis including the pyrolysis steps of,
    heating the tire waste at an initial heating rate to a process temperature,
    maintaining the process temperature for a processing time,
    maintaining a process atmosphere,
    cooling to an extraction temperature.

23. The method of claim 22 wherein the pyrolysis steps are controlled to optimize the processed materials in the injection stream.

24. The method of claim 22 wherein the initial heating rate is controlled to control the ratios of gases, liquids and solids.

25. The method of claim 22 wherein the process temperature is controlled to control the ratios of gases, liquids and solids.

26. The method of claim 22 wherein the process atmosphere is controlled to control the ratios of gases, liquids and solids.

27. The method of claim 22 wherein the extraction temperature is controlled to control the ratios of gases, liquids and solids.

28. The method of claim 22 wherein the processed materials are further processed to an injection temperature at an injection pressure.

29. The method of claim 20 wherein an enhancing agent is added to the insertion stream for increasing the solubilizing ability of the injection stream.

30. The method of claim 29 wherein the enhancing agent includes gyro-char.

* * * * *